United States Patent [19]

Kurihara

[11] Patent Number: 5,606,159
[45] Date of Patent: Feb. 25, 1997

[54] INFORMATION RECORDING MEDIUM CLEANING MECHANISM

[75] Inventor: Hideo Kurihara, Tokyo, Japan

[73] Assignee: Canon Kabushiki Kaisha, Tokyo, Japan

[21] Appl. No.: 473,954

[22] Filed: Jun. 7, 1995

Related U.S. Application Data

[60] Continuation of Ser. No. 151,051, Nov. 12, 1993, abandoned, which is a division of Ser. No. 858,429, Apr. 8, 1992, abandoned, which is a continuation of Ser. No. 499,580, Mar. 27, 1990, abandoned, which is a continuation of Ser. No. 228,460, Aug. 5, 1988, abandoned.

[30] Foreign Application Priority Data

Aug. 11, 1987 [JP] Japan ................................. 62-200296
Aug. 11, 1987 [JP] Japan ................................. 62-200299
Aug. 11, 1987 [JP] Japan ................................. 62-200300
Oct. 15, 1987 [JP] Japan ................................. 62-260647

[51] Int. Cl.⁶ ............................................. G06F 7/00
[52] U.S. Cl. ............................................. 235/438; 235/475
[58] Field of Search ............................. 235/438, 455, 235/475, 482

[56] References Cited

U.S. PATENT DOCUMENTS 3,820,068 6/1974 McMillin ........................... 235/455
4,006,507 2/1977 Yoshida ............................... 15/102
4,020,357 4/1977 Punis .................................. 235/455
4,373,114 2/1983 Herbst ................................ 235/455
4,605,896 8/1986 Obrecht ............................. 235/438
4,743,745 5/1988 Kachi ................................. 235/482
4,947,029 8/1990 Kurihara ............................ 235/475
4,950,877 8/1990 Kurihara ............................ 235/482

FOREIGN PATENT DOCUMENTS 3044728 9/1981 Germany .
3038823 9/1981 Germany .
3007841 9/1981 Germany .
55-28570 2/1980 Japan .
62-14326 1/1987 Japan .
62-026475 2/1987 Japan .................................. 235/482

Primary Examiner—Harold Pitts
Attorney, Agent, or Firm—Fitzpatrick, Cella, Harper & Scinto

[57] ABSTRACT

An information recording medium cleaning device includes moving the recording medium and the cleaning device relative to each other and a detection device for detecting a degree of stain caused by dust, fingerprints or oil, for example, on the information recording medium. Cleaning is performed based on the degree of stain detected on the information recording medium.

7 Claims, 17 Drawing Sheets

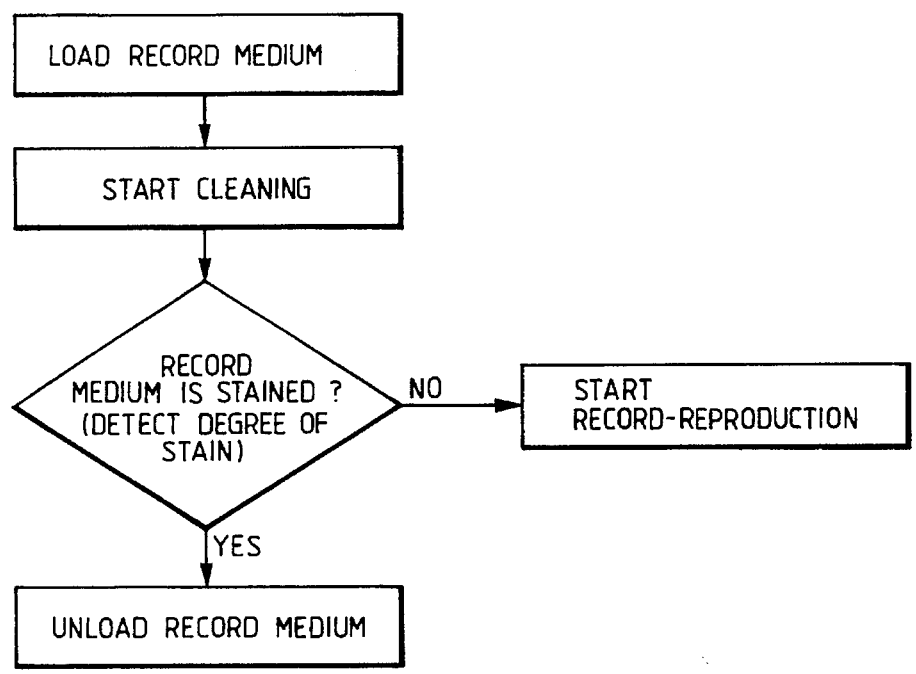
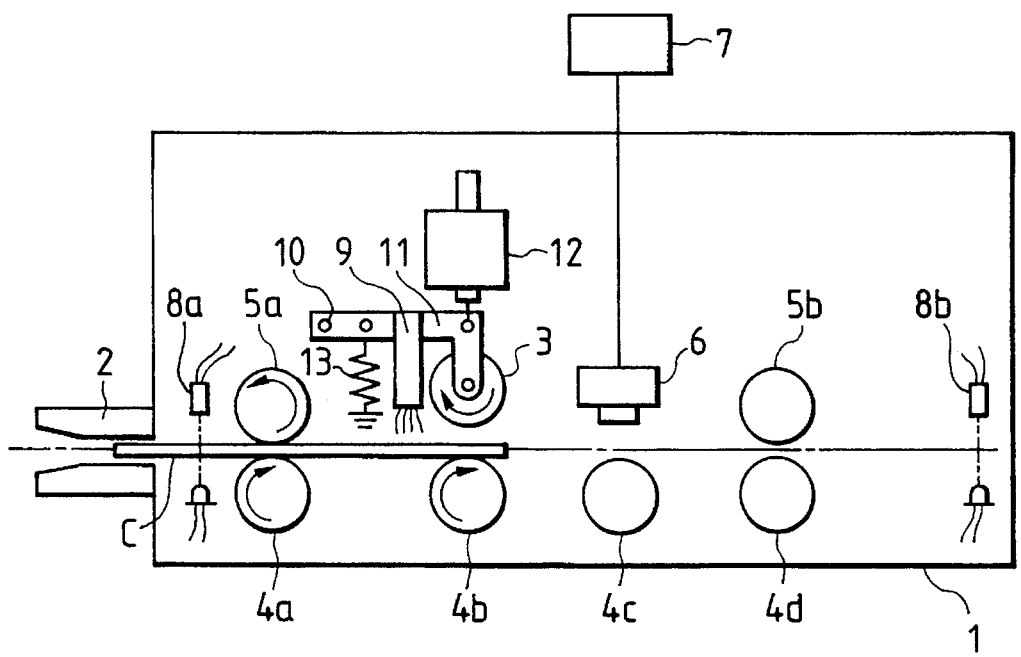

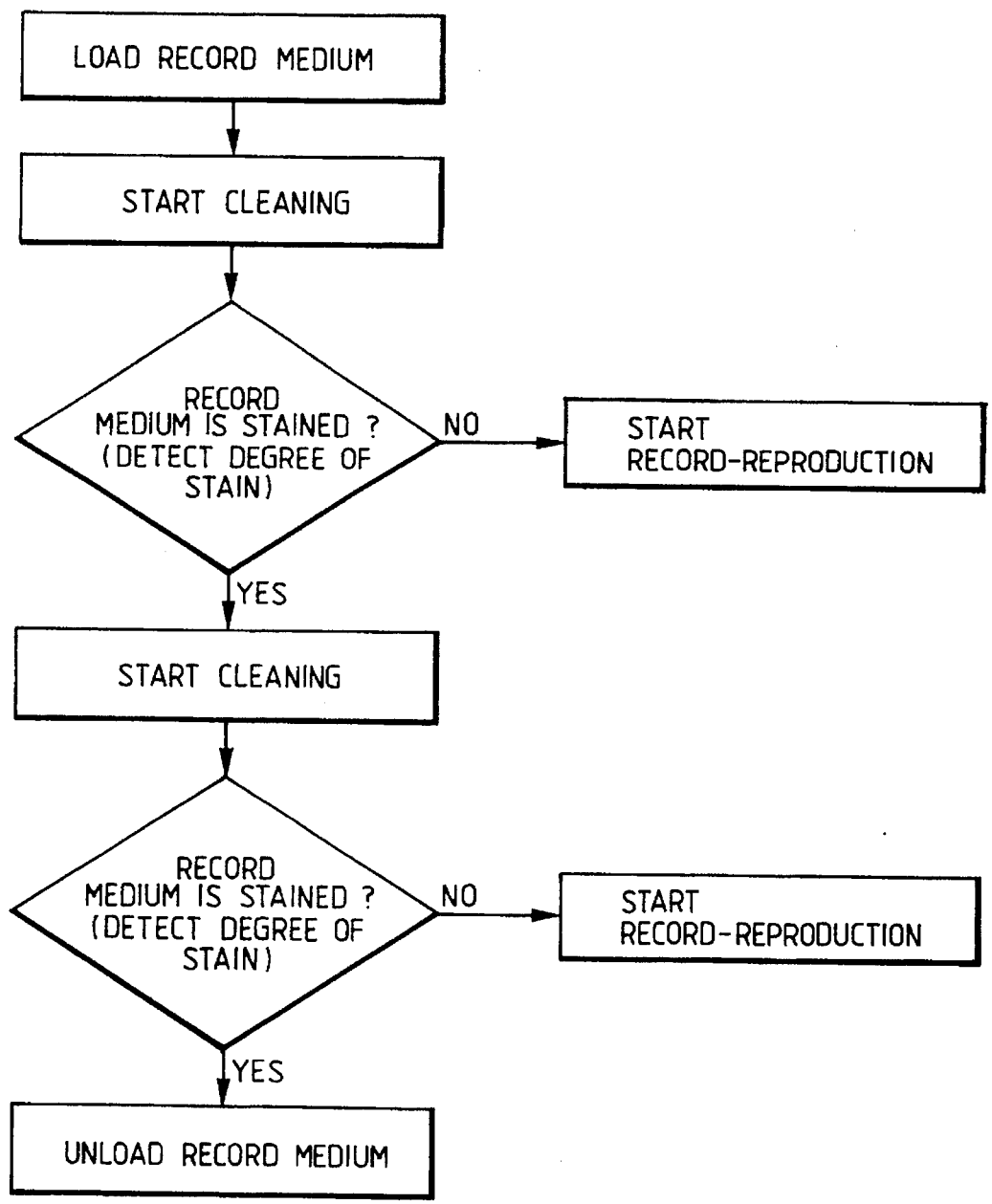

INFORMATION RECORDING MEDIUM CLEANING MECHANISM

This application is a continuation of prior application, Ser. No. 08/151,051 filed Nov. 12, 1993, which application is a divisional of prior application, Ser. No. 07/858,429 filed Apr. 8, 1992, which application is a continuation of prior application, Ser. No. 07/499,580 filed Mar. 27, 1990, which application is a continuation of prior application, Ser. No. 07/228,460 filed Aug. 5, 1988, all now abandoned.

BACKGROUND AND SUMMARY OF THE INVENTION

The present invention relates to an apparatus having a cleaning mechanism for removing dust, fingerprints, oil, and the like attached to, e.g., a card-like information record medium.

A conventional means for removing dust, fingerprints, oil, and the like attached to an information record medium is disclosed in Japanese Utility Model Publication No. 53-30902. A cleaner made of a soft material and having projections and recesses which are alternately formed is arranged to oppose an insertion path of a card as an information record medium, and the card is clamped between the projections and the recesses, thereby cleaning the card.

In such a cleaning mechanism, however, since the cleaner is fixed, the card is cleaned at the time of card insertion and discharge. Even if the card is not stained or badly stained, the card is cleaned without exceptions, thus degrading cleaning efficiency.

Another conventional cleaning mechanism including a cleaning roller, a cleaning brush, and a cleaning fan, all of which are arranged near the card insertion port is disclosed in U.S. Pat. No. 4,006,507 and U.S. Ser. No. 4,947,029.

Since cleaning is always performed at the time of card insertion in the above cleaning mechanism, cleaning of a non-stained card is of no use, and the service life of the cleaning mechanism is undesirably shortened. In addition, since such a cleaning mechanism does not have a mechanism for detecting the degree of stain of the card, the same cleaning operation is performed for a card which is not very stained as well as a badly stained card. For this reason, when the card is badly stained, record-reproduction is started although the card is not sufficiently cleaned. Therefore, record-reproduction operations are inaccurate.

In conventional cleaning mechanisms, since the cleaner itself is stained, cleaning of the information record medium cannot be efficiently performed.

Still another conventional cleaning mechanism is disclosed in U.S. Pat. No. 4,947,029. In this cleaning mechanism, a cleaning roller is combined with a driving roller for conveying an information record medium to clamp the information record medium therebetween. A rotational direction and speed of the cleaning roller are set to be different from those of the driving roller to clean the surface of the information record medium. The mechanism employing the cleaning roller has a longer service life than that described in Japanese Utility Model Publication No. 53-30902 and has an advantage in that cleaning can be effectively performed. However, when the information record medium is badly stained, the stain cannot be perfectly removed from the medium when the medium passes through the cleaning roller once. Therefore, the card must often pass through the cleaning roller several times to obtain a satisfactory cleaning effect.

A plurality of cleaning rollers may be arranged parallel to each other to increase the cleaning effect. However, the load generated by the plurality of cleaning rollers is increased, and the driving force for conveying the information recording medium is undesirably increased. If the medium is driven by, e.g., a motor, a solenoid, and the like, power consumption is undesirably increased.

A plurality of cleaning rollers may be arranged in a unit to increase the cleaning effect. However, in this case, upstream rollers absorb more stain than downstream rollers. Therefore, the service life of the upstream and downstream rollers differ from each other, resulting in inconvenience.

The above problems also apply in cleaning of information record media having various shapes, in addition to cleaning of cards.

It is an object of the present invention to provide an information record medium cleaning apparatus which can solve the conventional problems described above, is inexpensive, has a long service life, and can effectively perform cleaning with efficiency.

It is another object of the present invention to provide an information record medium cleaning apparatus which can effectively perform cleaning with a small driving force.

In order to achieve the above objects, according to an aspect of the present invention, there is provided an apparatus for cleaning an information record medium in which the information record medium and means for cleaning the information record medium are relatively moved to clean the information record medium, comprising means for detecting the degree of stain of a surface of the information record medium which is received in the apparatus, wherein the information record medium is cleaned in accordance with a signal from the stain degree detecting means.

In order to achieve the above objects, according to another aspect of the present invention, there is provided an apparatus for cleaning an information record medium, comprising first cleaning means for removing stain of a record surface of the information record medium, and second cleaning means for cleaning a cleaning surface of the first cleaning means.

In order to achieve the above objects, according to still another aspect of the present invention, there is provided an apparatus for cleaning an information record medium, wherein a plurality of cleaning rollers for cleaning a record surface of the information record medium are arranged parallel to each other along a convey path of the information record medium in such a manner that a rotational direction of at least one of the cleaning rollers is opposite to that of remaining ones of the cleaning rollers.

In order to achieve the above objects, according to still another aspect of the present invention, there is provided an apparatus for cleaning an information record medium, wherein a plurality of cleaning rollers for cleaning a record surface of the information record medium are mounted on a holding member and arranged parallel to each other along a convey path of the information record medium, the cleaning rollers being independently attached to or detached from the holding member.

BRIEF DESCRIPTION OF THE DRAWINGS

FIG. 3 is a flow chart for explaining stain degree detection according to the present invention;

FIG. 4 is a flow chart for explaining stain degree detection according to the present invention;

FIG. 5 is a schematic view of an information record-reproduction system incorporating a cleaning apparatus of an information record medium according to the present invention;

DESCRIPTION OF THE PREFERRED EMBODIMENTS

The present invention will be described with reference to illustrated preferred embodiments hereinafter.

Figure 1:
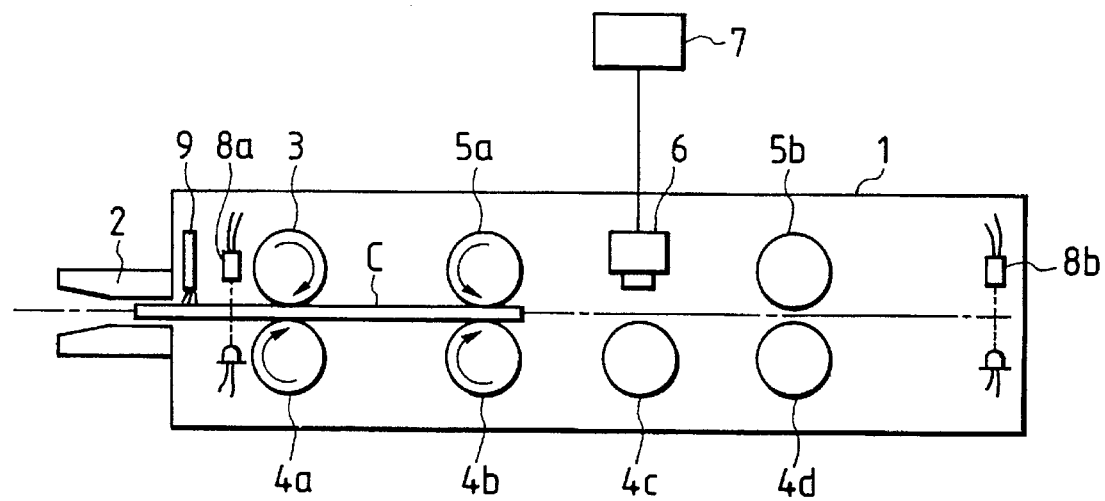
FIG. 1 is a schematic view of an information record-reproduction system incorporating a cleaning apparatus of an information record medium according to an embodiment of the present invention.
Figure 2:
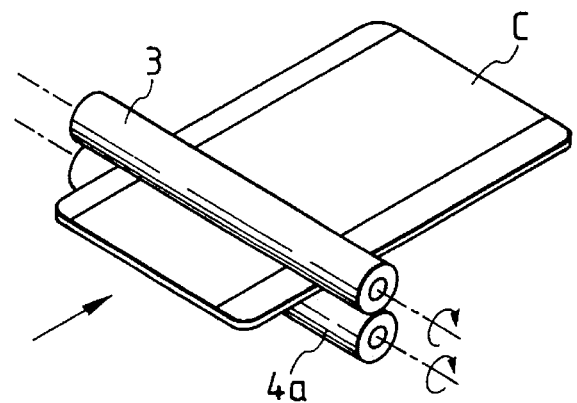
FIG. 2 is a perspective view showing a cleaning mechanism shown in FIG. 1.

FIG. 1 is a schematic view of an information record-reproduction system incorporating a cleaning apparatus for an information record medium according to the present invention. An insertion slot 2 is formed at one side surface of an apparatus housing 1 to receive a card C consisting of an optical card as an information record medium. A cylindrical cleaning roller 3 is arranged along a convey path of the card C inside the housing 1. A series of driving rollers 4a, 4b, 4c, and 4d for conveying the card C are arranged inside the housing 1. The driving roller 4a is paired with the cleaning roller 3. The driving rollers 4b and 4d are paired with driven rollers 5a and 5b, respectively. A record-reproduction head 6 for recording or reproducing information is arranged between the drive rollers 5a and 5b. A stain degree detector 7 is connected to the record-reproduction head 6. First and second photosensors 8a and 8b are respectively arranged on the rear side of the insertion slot 2 of the housing 1 opposite to the insertion slot 2 to detect the presence/absence of the card C so as to control the rotational direction of the driving rollers 4a to 4d. A conductive brush 9 is arranged near the insertion slot 2 to remove dust and the like from the surface of the card C and eliminate electrostatic components from the card C. The cleaning roller 3 is made of an elastic material for absorbing stain such as dust, fingerprints, and oil. The rotational direction and speed of the cleaning roller 3 are determined independently of those of the driving rollers 4a to 4d. For example, as shown in FIG. 2, the rotational direction of the cleaning roller 3 is the same as that of the driving rollers 4a to 4d and is opposite to the feed direction of the card C, and vice versa. The speed of the cleaning roller 3 may be equal to, lower than, or higher than that of the driving rollers 4a to 4d.

In the embodiment shown in FIG. 1, when the card C is inserted in the insertion slot 2, the first photosensor 8a detects that the card C has been inserted. In response to a signal from the first photosensor 8a, the driving rollers 4a to 4d are rotated clockwise, thereby receiving the card C inside the housing 1. In this case, the cleaning roller 3 which is in rolling contact with the surface of the card C may be rotated in the same direction as that of the driving rollers 4a to 4d, i.e., clockwise. The speed of the cleaning roller 3 is set to be higher than that of the driving rollers 4a to 4d, thereby wiping dust, fingerprints, oil, and the like from the card C. Prior to the operation of the cleaning roller 3, dust present on the surface of the card C and electrostatic components are removed by the conductive brush 9. The card C cleaned by the conductive brush 9 and the cleaning roller 3 is conveyed by the driving rollers 4a to 4d and the driven rollers 5a and 5b to a position below the record-reproduction head 6. Information is recorded in or reproduced from the card C by the record-reproduction head 6. When recording or reproduction is completed, this is detected by the second photosensor 8b, the driving rollers 4a to 4d are rotated in the reverse direction, i,e., counterclockwise, and the card C is discharged outside through the insertion slot 2.

In the above embodiment, the cleaning roller 3 is rotated in the same direction as that of the driving rollers 4a to 4d, and the speed of the cleaning roller 3 is higher than that of the driving rollers 4a to 4d. The dust and the like attached to the surface of the card C are scattered outside the housing 1. Therefore, dust and the like do not enter inside the housing 1. If the rotational direction of the cleaning roller 3 is the same (clockwise) as that of the driving rollers 4a to 4d, i.e., the move direction of the cleaning surface of the cleaning roller is opposite to the move direction of the drive surface of the driving rollers, dust and the like can be scattered outside the housing. When the speed of the cleaning roller 3 is higher than that of the driving rollers 4a to 4d, i.e., the move speed of the cleaning surface of the cleaning roller is higher than the move speed of the driving surface of the driving roller, the cleaning surface of the cleaning roller can be more frequently kept in rolling contact with the surface of the card C, thereby performing efficient cleaning. In addition, when the rotational direction of the cleaning roller 3 is the same as that of the driving rollers 4a to 4d, the speed of the cleaning roller 3 may be equal to that of the driving rollers 4a to 4d or may be lower than that without any problems.

If the rotational direction of the cleaning roller 3 is opposite (counterclockwise) to that (clockwise) of the driving rollers 4a to 4d, a sufficient cleaning effect can be obtained if the speed of the cleaning roller 3 is different from that of the driving rollers 4a to 4d. In this case, if the speed of the cleaning roller 3 is higher than that of the driving rollers 4a to 4d, i.e., the move speed of the cleaning surface of the cleaning roller is higher than that of the driving surfaces of the driving rollers, the cleaning surface of the cleaning roller can be more frequently kept in rolling contact with the surface of the card C, thereby achieving efficient cleaning.

In the series of operations described above, the record-reproduction head 6 reproduces information from several points of the card prior to recording or reproduction of unit information with the record-reproduction head 6. The sampled reproduced signals are input to the stain degree detector 7, so that the detector 7 can detect the degree of stain of the card C. Stain degree detection is performed in, e.g., the optical information record-reproduction system as follows. In the system, recorded information is reproduced due to a change in amount of light reflected by a pit formed on the card C. When information is reproduced from a given track recorded with data and an abrupt decrease in the amount of light reflected by the track is detected, the stain degree detector 7 detects the degree of stain, since the decrease is caused by dust or the like attached to the surface of the card C.

When an amount of light reflected by the card is equal to or smaller than an arbitrary amount, the detector 7 detects "stained". However, when an amount of light reflected by the card is larger than the arbitrary amount, the detector 7 detects "not stained".

When the detector 7 detects that the card is "stained", the card C is unloaded from the housing since it is impossible to clean the card C due to the following reason. In the arrangement of FIG. 1, when the card C is inserted or loaded in the housing 1, it is cleaned once, and the cleaned card is subjected to stain degree detection. If the card C is cleaned once and the stain cannot be removed from the card, it is determined that it is impossible to clean the card. However, when it is determined that the card C is "not stained", information is recorded in the card C or reproduced therefrom (the above operations are shown in the flow chart of FIG. 3).

Even when it is determined that the card C is "stained", the card C may be cleaned again. When the card is cleaned several times, the stain of the card may be removed. When the stain of the card is not removed after cleaning is performed several times, the card is unloaded from the apparatus. When it is determined that the card is "not stained", information is recorded in or reproduced from the card (the above operations are shown in the flow chart of FIG. 4).

In the above embodiment, the card is cleaned by the cleaning roller when the card is inserted. However, a mechanism for spatially moving the cleaning roller 3 may be arranged. In this case, when the card is inserted, the cleaning roller may be moved upward and the card is not cleaned and is subjected to stain degree detection. With this arrangement, the service life of the cleaning roller can be prolonged. When it is determined that the card is "not stained", the cleaning roller 3 may be moved upward. That is, when it is determined that the card is "not stained", the cleaning means need not be used. With this arrangement, dust will not be attached to the clean card by the cleaning roller and the like.

FIG. 5 shows another embodiment. The same reference numerals as in FIG. 1 denote the same parts in FIG. 5. A cleaning roller 3 is combined with a driving roller 4b. The cleaning roller 3 and a conductive brush 9 are mounted on a lever 11 which is rotatably supported about a shaft 10 and are kept upward by a solenoid 12 so as not to be brought into contact with the card C. A spring 13 is connected to the lever 11 to bring the cleaning roller 3 and the conductive brush 9 into contact with the card C as needed. The solenoid 12 and the spring 13 may be used in a reverse manner. That is, the cleaning roller 3 and the conductive brush 9 may be brought into contact with the card C by the solenoid 12, and the card C may be kept at a position where the cleaning roller 3 and the conductive brush 9 are not brought into contact with the card C. At any rate, the spatial positions of the cleaning roller 3 and the conductive brush 9 can be changed.

In the embodiment of FIG. 5, the card C inserted in an insertion slit 2 is removed by driving rollers 4a to 4d inside a housing 1 in the same manner as in the embodiment of FIG. 1. Since the cleaning roller 3 and the conductive brush 9 are kept upward by the solenoid 12, the card C is not cleaned and is further conveyed. A record-reproduction head 6 reproduces data from several positions of the card C prior to normal recording or reproduction of the information with the record-reproduction head 6. A stain degree detector 7 detects the degree of stain of the surface of the card in accordance with the reproduced signals of the several points of the card C. If the stain is negligible, the information is recorded in or reproduced from the card without cleaning, and the card C is unloaded outside the housing in the same manner as in the embodiment of FIG. 1. During unloading, since the cleaning roller 3 and the conductive brush 9 are separated from the card surface, no cleaning is performed.

However, when the card is badly stained, the driving rollers 4a to 4d are rotated in the reverse direction, and the card C returns to the cleaning roller 3. At the same time, the solenoid 12 is deenergized and the cleaning roller 3 and the conductive brush 9 are moved downward by the spring 13, thereby performing cleaning of the card C. When cleaning is completed, the driving rollers 4a to 4d are rotated in the reverse direction again, and the card C is conveyed to a position below the record-reproduction head 6, thereby performing information recording or reproduction. During unloading, the cleaning roller 3 and the conductive brush 9 return to the home positions, and no cleaning is performed.

The above operations will be described with reference to a block diagram in FIG. 6 and a flow chart in FIG. 7.

Figure 6:
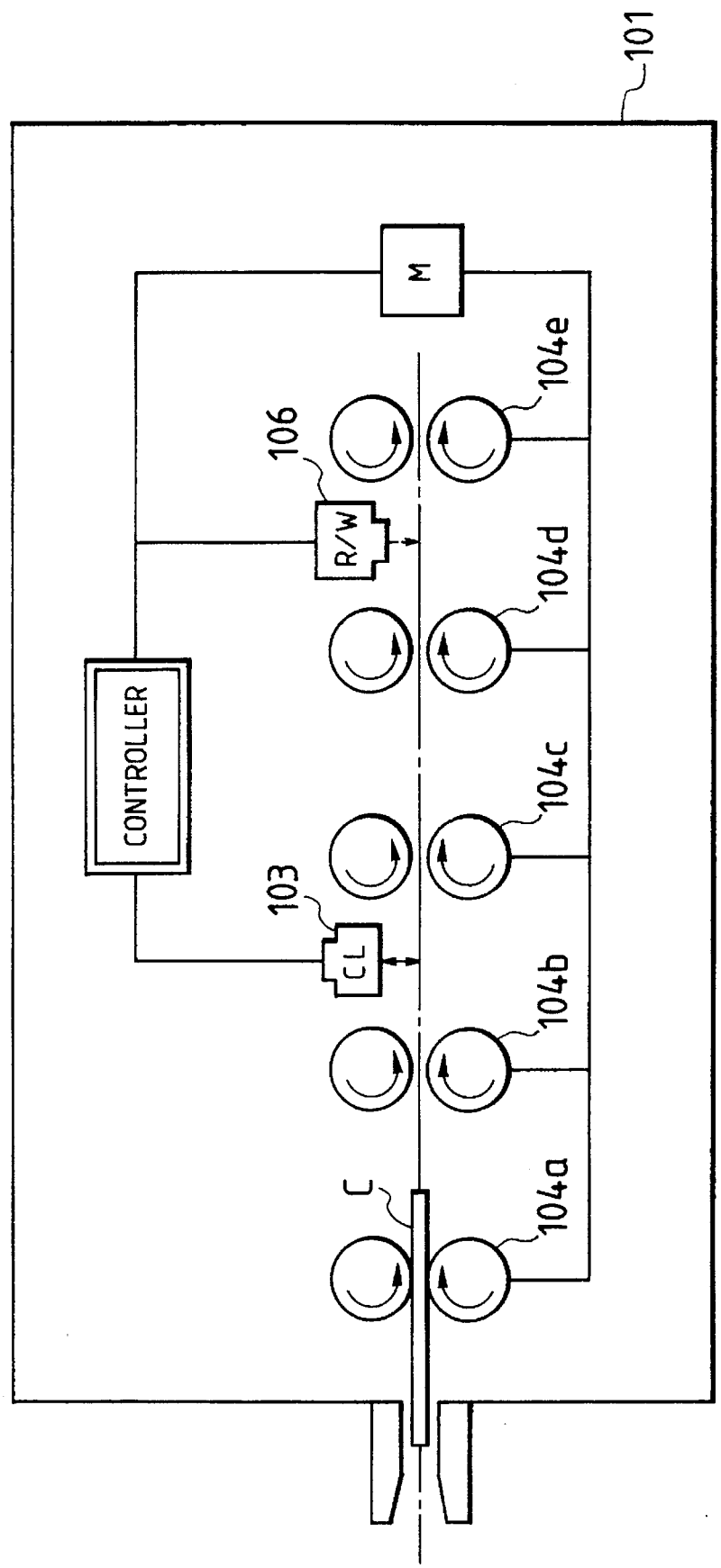
FIG. 6 is a block diagram for explaining stain degree detection according to the present invention.
Figure 7:
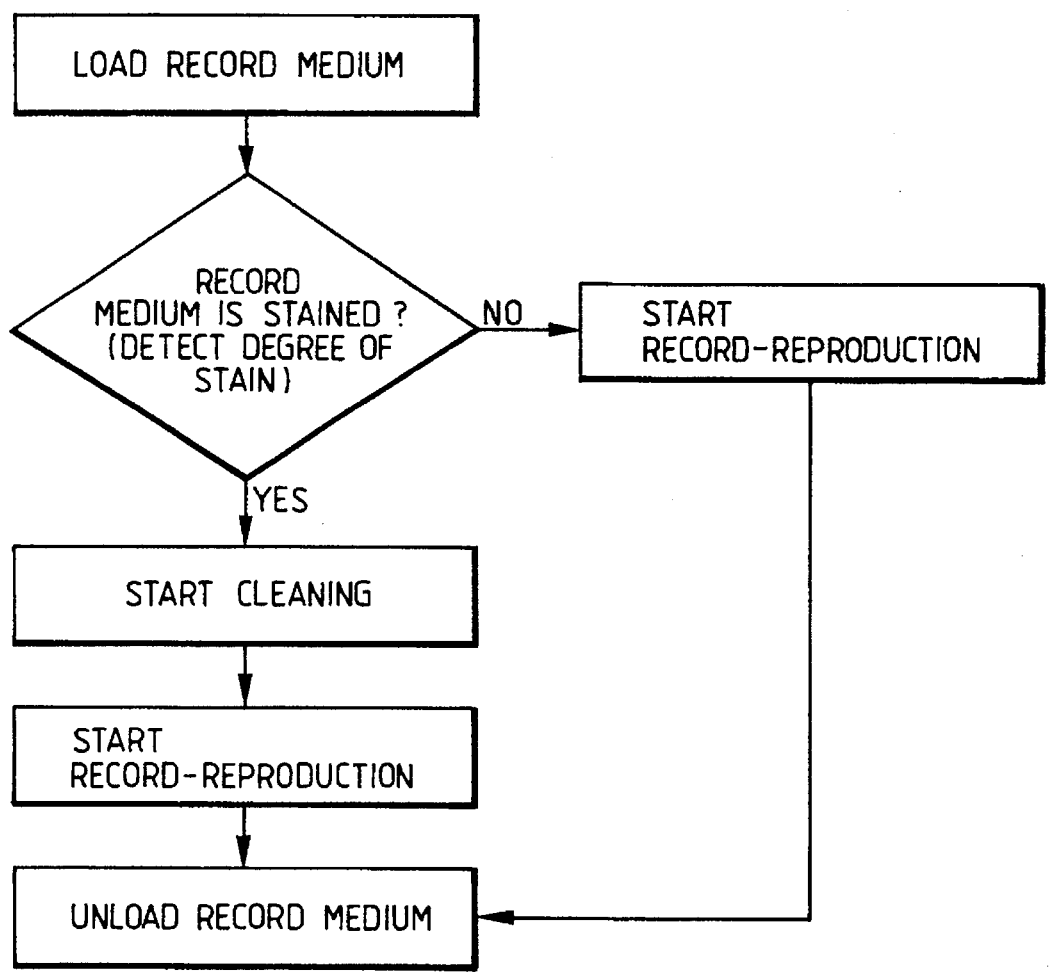
FIG. 7 is a flow chart for explaining stain degree detection according to the present invention.

Elements which are not directly associated with the concepts of the present invention are omitted in the block diagram in FIG. 6 and the flow chart in FIG. 7. The card C inserted in a housing 101 is conveyed deep in the housing by driving rollers 104a to 104e driven by a motor M without being cleaned. Information of the card C is reproduced with a record-reproduction head 106, and the reproduced signal is supplied to a controller. The controller detects and determines the degree of stain of the card C in accordance with the reproduced signal. When the controller determines that the card is not so stained, the record-reproduction head 106 performs recording or reproduction of the information. When recording or reproduction is completed, the card C is unloaded from the housing 101. However, when the controller determines that the card is badly stained, the driving rollers 104a to 104e are rotated by the motor M in the reverse direction, so that the card C returns toward the cleaning head 103. The cleaning head 103 is moved downward and cleans the card C. When cleaning is completed, the cleaning head 103 is moved upward, and the driving rollers 104a to 104e are rotated by the motor M in the reverse direction. The card C returns toward the record-reproduction head 106. The record-reproduction head 106 performs recording or reproduction of the information, and the card C is unloaded from the housing upon completion of recording or reproduction.

In the above embodiment, the record-reproduction head also serves as a means for detecting the degree of stain of the information record medium. However, the record-reproduction head and the stain degree detecting means may be separately arranged.

In the above embodiment, the information recorded in the information record medium is reproduced with the reproduction head, and the degree of stain is detected in accordance with the reproduced signal. However, predetermined information may be recorded in the information record medium and may be reproduced with the reproduction head. This reproduced signal output may be used to detect the degree of stain.

In each embodiment described above, information is reproduced from several points of the information record medium to detect the degree of stain of the card.

For example, the size of a credit card is about 85 mm×55 mm. Information recording tracks are not formed on the entire surface of the card. The width of the information recording tracks of the information record medium is a maximum of about 50 mm. However, a major stain source is given as fingerprints formed upon touching of the card with fingers. The size of each fingerprint is a maximum of about 10 mm. Therefore, information may be reproduced every 5 to 10 information tracks to detect the degree of stain of the card.

In each embodiment described above, during cleaning, the degree of stain on the surface of the card is not performed due to the following reason. During cleaning, a load acts on the card by the cleaning roller and the like, and stable travel of the card cannot be expected. That is, it is difficult to stably detect the degree of stain along the longitudinal direction of the card. During cleaning, information is not recorded in or reproduced from the card due to the following reason. During cleaning, a load acts on the card by the cleaning roller and the like, and stable travel of the card cannot be expected. That is, it is difficult to stably record information in the card or reproduce it therefrom along the entire longitudinal direction of the card.

As is apparent from the above description, cleaning is performed only when the card C is badly stained. In addition, during unloading, cleaning is not performed. Therefore, the wear of the cleaning members can be reduced and their service life can be prolonged. When cleaning is performed by the cleaning roller 3, a convey time is prolonged due to the loading resistance. When the card C is not so stained, cleaning is not performed, thereby shortening the working time and improving efficiency.

In each embodiment, the stain degree detector 7 detects the degree of stain in accordance with the reproduced output from the record-reproduction head. However, various types of stain degree detecting means may be utilized, such as a detecting means (e.g., a pair of LED light source and a one-dimensional array as a light-receiving element) consisting of a pair of light-emitting and light-receiving elements and utilizing reflectivity. The number of cleaning cycles upon detection of the degree of stain can be arbitrarily determined until the stain is removed. If the stain degree detection result cannot be improved even after the cleaning cycles are repeated several times, the card C is unloaded from the housing, and an error may be displayed so as to signal to the user that recording or reproduction of the card C cannot be performed due to stain or damage. In addition, when an information reproduction or recording error rate exceeds a predetermined rate, the presence of "stain" may be detected, and cleaning may be performed.

A contrast difference of the R/F signal which is caused by the presence/absence of a pit upon reproduction, a magnitude of an auto tracking error signal, a magnitude of an auto focus error signal, a magnitude of a phase error signal, a reflectivity of an information record medium, and a modulated signal of a track upon crossing of the beam across the information record medium are greatly decreased when stain or damage is present on the surface of the card C because light reflected by the card is scattered, and the amount of reflected light is greatly decreased. This amount of reflected light is greatly different from that when the surface of the card C is not stained. In this case, the range of a signal level obtained when the card is not stained at all to a signal level obtained when the card is stained, but marginally used, is determined. If a given signal level falls outside this range, it is determined that the card is "stained".

If disturbance such as vibration occurs during detection of the degree of stain of the card, the card may be erroneously detected to be stained although the card is not stained at all. In this case, the degree of stain 0f the card is detected again. If "stain" is repeatedly detected at the same position of the card, it may be determined that the card is stained.

Still another embodiment of the present invention will be described with reference to a block diagram in FIG. 8 and a flow chart in FIG. 9. Elements which are not directly associated with the concepts of the present invention are omitted from the block diagram and the flow chart. A card C inserted in a housing 101 is detected by an insertion state detecting means (I.S) 108. A motor M is driven to drive driving rollers 104a to 104g so that the card C is conveyed deep inside the housing 101. When the insertion state detecting means (I.S) 108 detects card insertion, a detection signal is supplied to a controller. A counter n for counting cleaning cycles in the controller is reset to zero. The degree of stain of the card which is further conveyed is detected and determined by a stain degree detecting means (D.S) 107. When the detecting means 107 detects that the card C is not so stained, the card C is conveyed toward a record-reproduction head 106. Information is recorded in or reproduced from the card by the head 106. Upon completion of recording or reproduction, the card may be unloaded from the housing or may be stopped at an arbitrary position inside the housing. When the detecting means 107 detects that the card C is badly stained, the card C is conveyed toward a cleaning head 103 and the cleaning head 103 is moved downward, thereby cleaning the card C. When one cleaning cycle is completed, an end signal is supplied to the controller, so that the count of the counter n for counting the cleaning cycles is incremented to n+1. When the first cleaning cycle is completed, the count of the counter n is 1. The count of the counter n is compared with a preset cleaning count m (m is an integer of 1 or more). If n<m is established, the card is conveyed toward the stain degree detecting means (D.S) 107 again, and the degree of stain of the card is detected and determined again by the detecting means (D.S) 107. However, when the card C is not so stained, the card C is conveyed toward the record-reproduction head 106, and information is recorded in the card or reproduced therefrom by the head 106. Upon completion of recording or reproduction, the card may be unloaded from the housing or may be stopped at an arbitrary position inside the housing.

When the card C is badly stained, the card C is conveyed toward the cleaning head 103 and the cleaning head 103 is moved downward, thereby performing cleaning of the card C. When one cleaning cycle is completed, an end signal is supplied to the controller. The count of the counter n in the controller is incremented to n+1. When the second cleaning cycle is completed, the count of the counter n is 2. The count of the counter n is compared with the predetermined cleaning count m (m is an integer of 1 or more). If condition n<m is established, the card is conveyed toward the stain degree detecting means (D.S) 107. The degree of stain of the card is detected and determined by the detecting means (D.S) 107.

If n≥m, i.e., if the stain of the card cannot be removed even after the cleaning cycle is repeated a predetermined number of times, it is determined that the card is "nonusable". The card is unloaded outside the housing 101.

Figure 9:
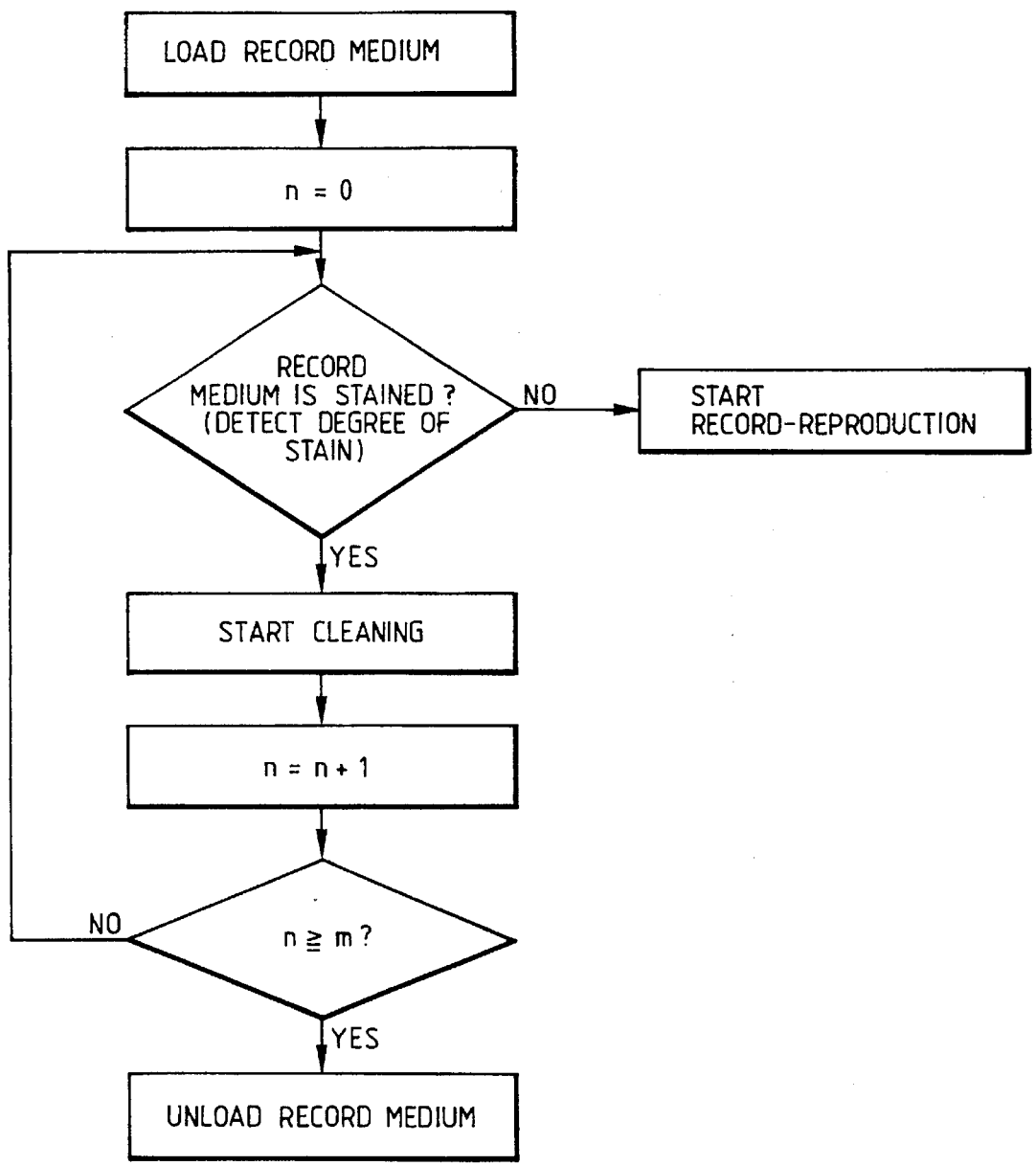
FIG. 9 is a flow chart for explaining stain degree detection according to the present invention.
Figure 10:
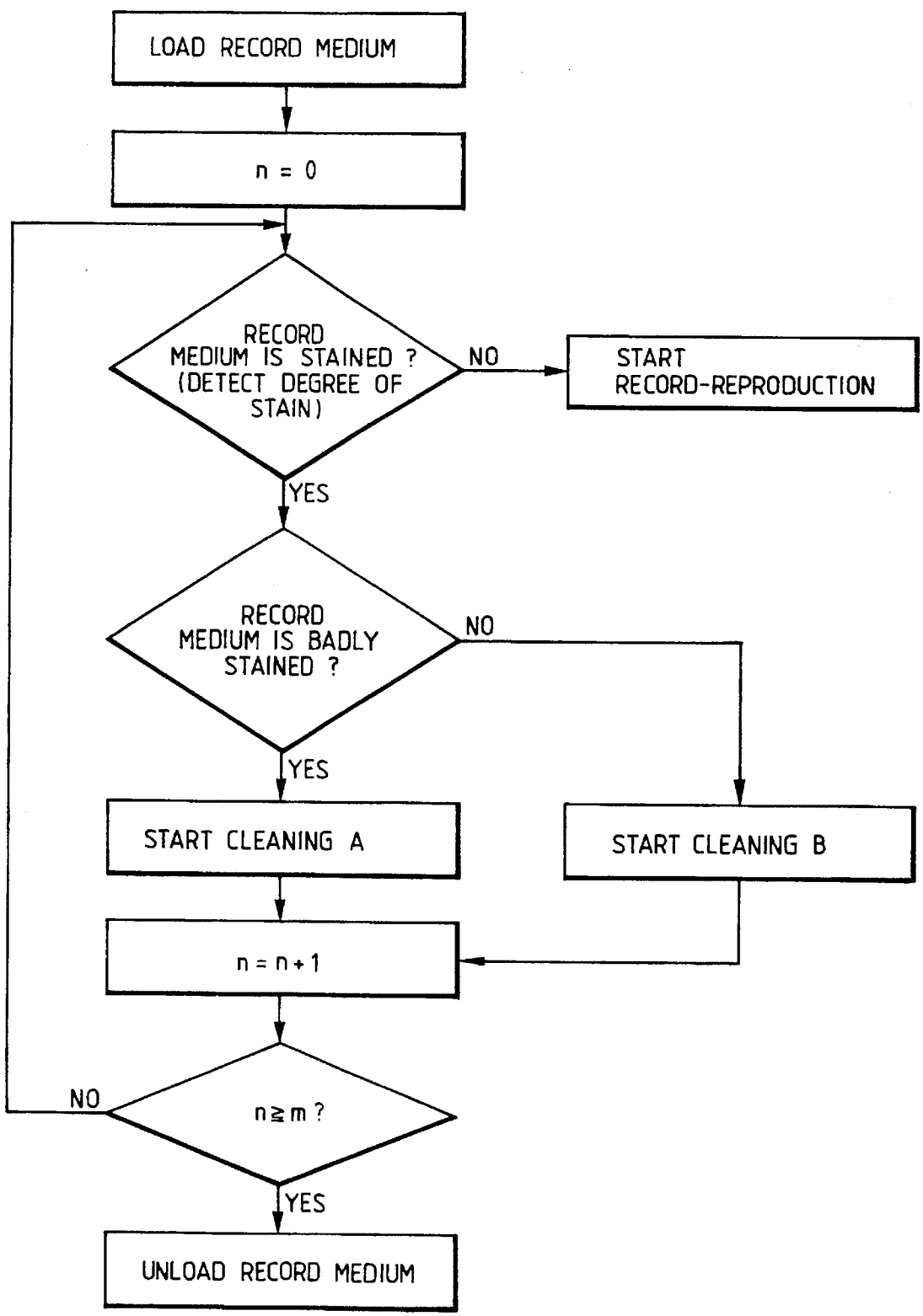
FIG. 10 is a flow chart for explaining stain degree detection according to the present invention.

A flow chart in FIG. 10 may also be used. The flow chart of FIG. 10 is programmed to select one of a plurality of cleaning cycles in accordance with the degree of stain, unlike in the flow chart of FIG. 9. When the card is not so stained, cleaning B (soft cleaning) is performed. However, when the card is badly stained, cleaning A (hard cleaning) is performed. In this manner, if the cleaning mode can be selected in accordance with the degree of stain, more effective cleaning can be performed.

Figure 8:
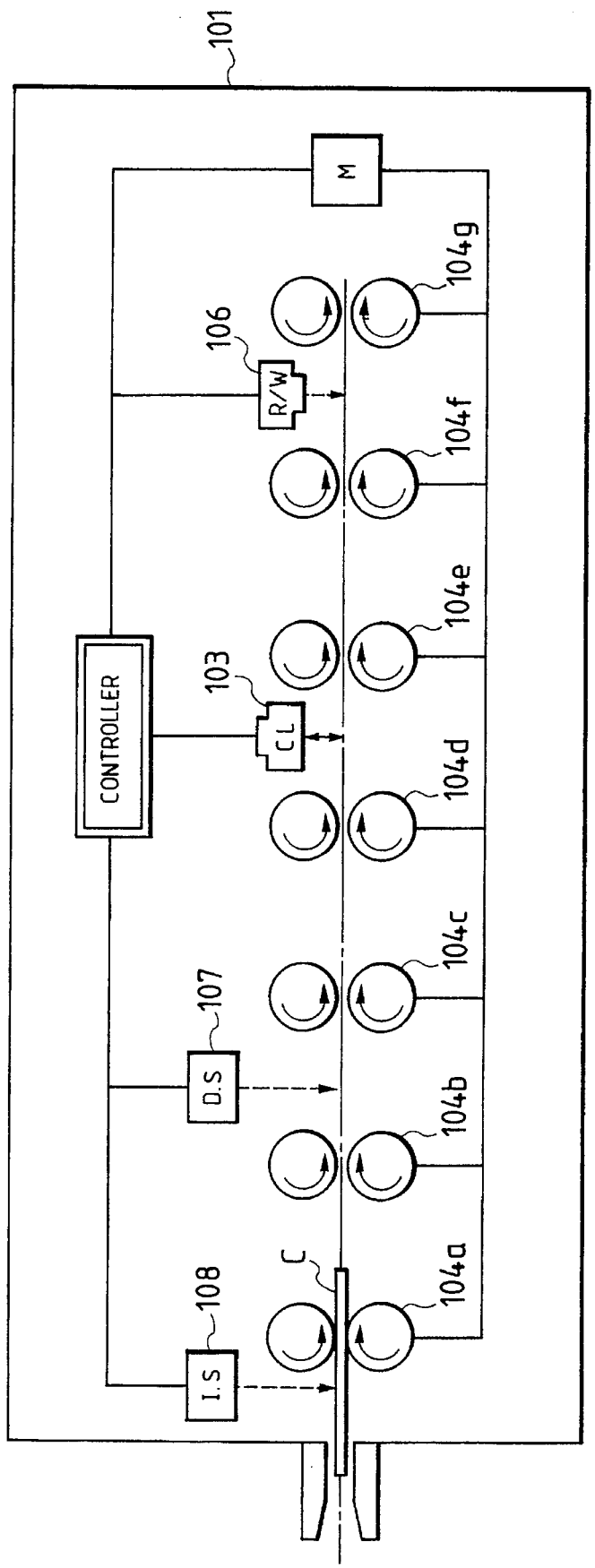
FIG. 8 is a block diagram for explaining a stain degree operation according to the present invention.

In the block diagram of FIG. 8, the record-reproduction head 106 and the stain degree detecting means (D.S) 107 are separately arranged. However, the head 106 may also serve as the detecting means 107. In addition, an order of arrangement of the stain degree detecting means (D.S) 107, the cleaning head 103, and the record-reproduction head 106 need not be limited to the one described above.

According to the cleaning apparatus for an information record medium of the present invention as has been described above, the degree of stain of the information record medium is detected. When cleaning is required, the cleaning mechanism is operated to perform sufficient cleaning, and then information recording or reproduction is performed. Therefore, information recording or reproduction can be reliably performed. In addition, cleaning is performed only when the card is badly stained, and cleaning is not performed during unloading of the information record medium. Therefore, the wear of the cleaning members can be reduced, their durability can be improved, and the operating time can be shortened to improve efficiency. In addition, when the stain degree detection result cannot be improved even if the cleaning cycle is repeated several times, the information record medium is unloaded without being cleaned. A message representing that the card cannot be cleaned is signalled to the operator. Therefore, inaccurate recording or reproduction can be prevented in advance.

Still another embodiment of the present invention will be described in detail below.

Figure 11:
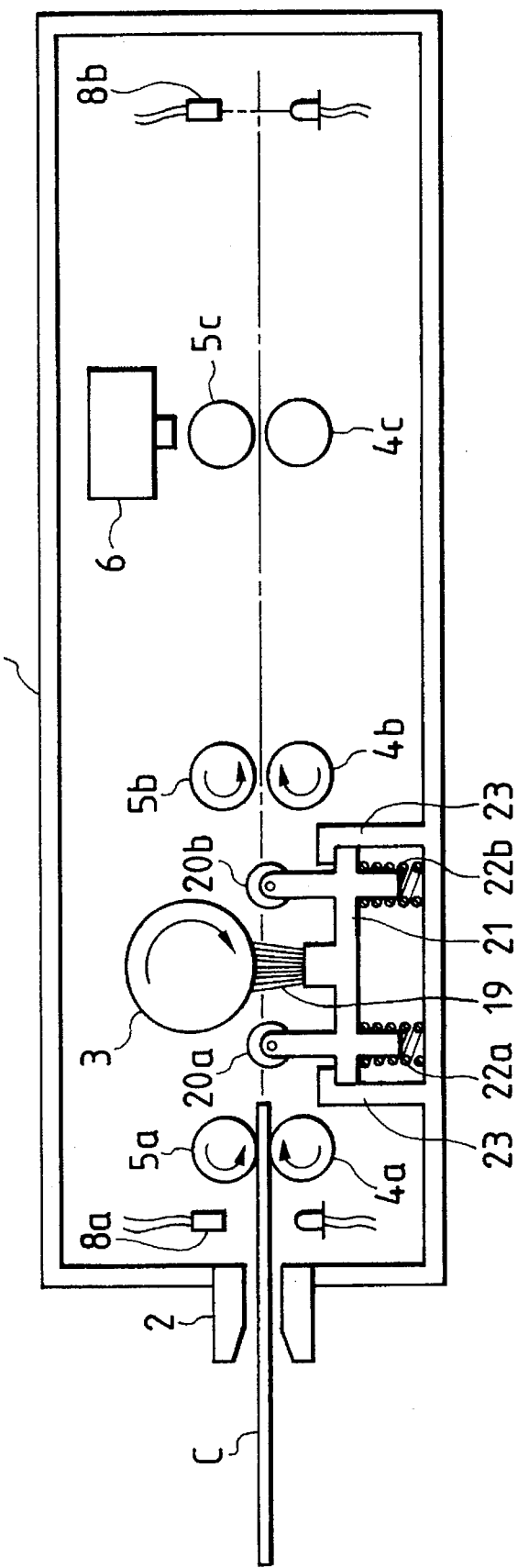
FIG. 11 is a schematic view showing a cleaning apparatus for an information record medium according to the present invention.
Figure 12:
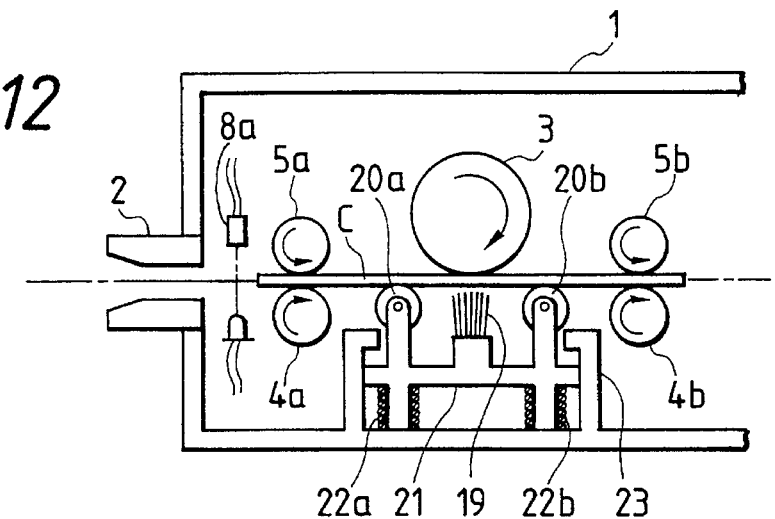
FIG. 12 is a partial schematic view of the cleaning apparatus shown in FIG. 11.
Figure 13:
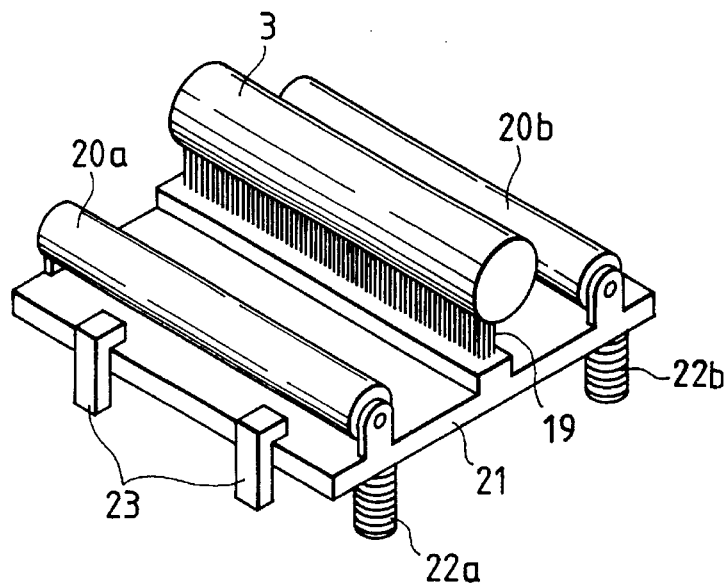
FIG. 13 is a perspective view of the cleaning apparatus shown in FIG. 11.

FIGS. 11 to 13 show an embodiment wherein a cleaning apparatus according to the present invention is applied to an information record-reproduction system. FIG. 11 shows a state wherein an information record medium is not in contact with a cleaning roller, FIG. 12 shows a state wherein the information record medium is in contact with the cleaning roller, and FIG. 13 shows the main part of a cleaning mechanism. Referring to FIGS. 11 to 13, an insertion slot 2 is formed on one side surface of an apparatus housing 1 to receive a card C consisting of an optical card as an information record medium. A cleaning roller 3 made of an elastic material for absorbing dust, fingerprints, oil, and the like attached to the surface, i.e., the record surface of the card C or having such a material on at least the outer surface is arranged inside the housing 1. A plurality of driving rollers 4a, 4b, and 4c are arranged inside the housing 1 to convey the card C and are paired with driven rollers 5a, 5b, and 5c located at the upper positions. The rotational direction of the cleaning roller 3 is the same as that of the driving rollers 4a to 4c, i.e., is opposite to the feed direction of the card C. A head 6 for recording or reproducing information is arranged near the driving roller 4c and the driven roller 5c. First and second photosensors 8a and 8b are respectively arranged on the insertion slot side of the housing 1 and a deep position opposite thereto. A brush 19 serving as a second cleaning means for cleaning a cleaning surface of the cleaning roller 3 is vertically movable so as to oppose the cleaning roller 3 through the convey path of the card C. The brush 19 is made of a material such as Nylon and is mounted together with front and rear rollers 20a and 20b on a vertically movable base member 21. The base member 21 is urged upward by springs 22a and 22b. A guide member 23 vertically guides and regulates the base member 21. This guide member 23 may be formed integrally with the housing 1 or may be separately prepared and mounted on the housing 1.

When the card C is not clamped, the brush 19 is in contact with the cleaning surface of the cleaning roller 3 so as to clean the card C, as shown in FIG. 11. However, when the card C is present, as shown in FIG. 12, the base member 21 is urged downward by the card C through the rollers 20a and 20b, and is separated from the cleaning roller 3. When the card C is not present, the uppermost positions of the rollers 20a and 20b are higher than the driving rollers 4a to 4c. The distal end of the brush 19 is slightly lower than the uppermost ends of the rollers 20a and 20b. Therefore, when the card C is fed under the cleaning roller 3, the rollers 20a and 20b are urged against the lower surface of the card C, as shown in FIG. 12. At the same time, the distal end of the brush 19 is removed to a position where the brush 19 is not brought into contact with the lower surface of the card C.

In this embodiment, when the card C is inserted from the insertion slot 2, the first photosensor 8a detects insertion of the card C. A detection signal from the first photosensor 8a causes clockwise rotation of the driving rollers 4a to 4c. At the same time, the cleaning roller 3 is rotated clockwise. The distance between the cleaning roller 3 and the driving rollers 4a and 4b is predetermined such that the cleaning roller 3 urges the card C fed on the brush 19 at a predetermined pressure. A material of each roller is selected such that a frictional force between the driving rollers 4a and 4b and the card C is set to be larger than that between the cleaning roller 3 and the card C. The card C is driven in the right direction upon rotation of the driving rollers 4a and 4b. In this case, the surface of the card C is moved at a large relative speed with respect to the outer surface of the cleaning roller while being in contact with the cleaning surface of the cleaning roller 3. The dust attached to the surface of the card C can be wiped out or scattered toward the insertion slot 2. Meanwhile, since the base member 21 is urged downward by the card C through the rollers 20a and 20b, the brush 19 is removed downward, as shown in FIG. 12 and is separated from the lower surface of the card C. For this reason, the dust and the like attached to the lower surface of the card C is not attached to the brush 19. If the brush 19 is fixed, the dust attached to the lower surface of the card C is attached to the brush 19 and then to the cleaning surface of the cleaning roller 3. In this embodiment, since the brush 19 is removed downward, such inconvenience does not occur. When the card C is not present between the rollers 20a and 20b, the base member 21 is urged upward by the springs 22a and 22b, as shown in FIGS. 11 and 13. The brush 19 is urged against the cleaning surface of the cleaning roller 3, and the dust attached to the cleaning surface 3 can be removed.

After the surface of the card C is cleaned by the cleaning roller 3, the card 1 is further conveyed, and information recording or reproduction of the card is performed by the record-reproduction head 6. When information recording or reproduction is completed, it is detected by the second photosensor 8b. A detection signal from the second photosensor 8b reverses the rotational direction of the driving rollers 4a to 4c. The card C is conveyed in the reverse direction and unloaded through the insertion slot 2. During unloading, the cleaning roller 3 may be moved upward, and the cleaning roller 3 may stop urging the card C. It should be noted that the rotational direction of the cleaning roller 3 is not limited to the illustrated direction, but may be in the reverse direction. In this case, a travel speed between the contact surfaces of the cleaning roller 3 and the card C is different from that of the driving rollers 4a and 4b, so that effective cleaning can be performed with efficiency.

Since the cleaning roller 3 for cleaning the card C can be cleaned by the second cleaning means, i.e., the brush 19, dust attached to the cleaning surface of the cleaning roller 3 in the previous cleaning cycle will not be attached to the surface of the card, thereby preventing degradation of the cleaning effect. Therefore, cleaning efficiency can be improved, and at the same time the service life of the cleaning roller can be greatly prolonged. In this case, if the base member 21 for supporting the cleaning roller 3 and/or the brush 19 can be replaced with a new one, maintenance of the cleaning apparatus can be simplified.

Figure 14:
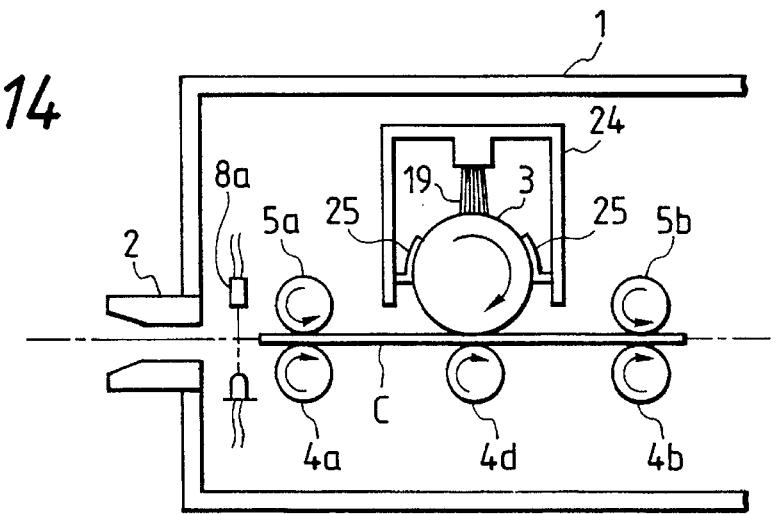
FIG. 14 is a schematic view of a cleaning apparatus for an information record medium according to the present invention.

FIG. 14 shows still another embodiment of the present invention. The same reference numerals as in FIGS. 11 to 13 denote like parts in FIG. 14. In the embodiment of FIG. 14, a brush 19 is mounted on a ceiling of a cylindrical or box-like frame 3 which covers a cleaning roller 3 from above. A dust collector 25 which is in slidable contact with the outer surface of the cleaning roller 3 is arranged at an opening of the frame 24. That is, the dust removed from the outer surface of the cleaning roller 3 by the brush 19 can be prevented by the dust collector 25 from being dropped on the surface of the card C. The cleaning roller 3 is paired with a driving roller 4d located therebelow.

In this embodiment, the cleaning roller 3 is always cleaned by the brush 19 regardless of whether the card C is present below the cleaning roller 3. Therefore, the surface of the card C can be cleaned by the cleaning surface which is always cleaned by the brush 19. In addition, since the brush 19 is located above the cleaning roller 3, the cleaning roller 3, the brush 19, the frame 24, and the dust collector 25 can be arranged as a detachable single unit. Therefore, when the cleaning roller 3 and the brush 19 are stained, the unit can be replaced with a new one.

Figure 15:
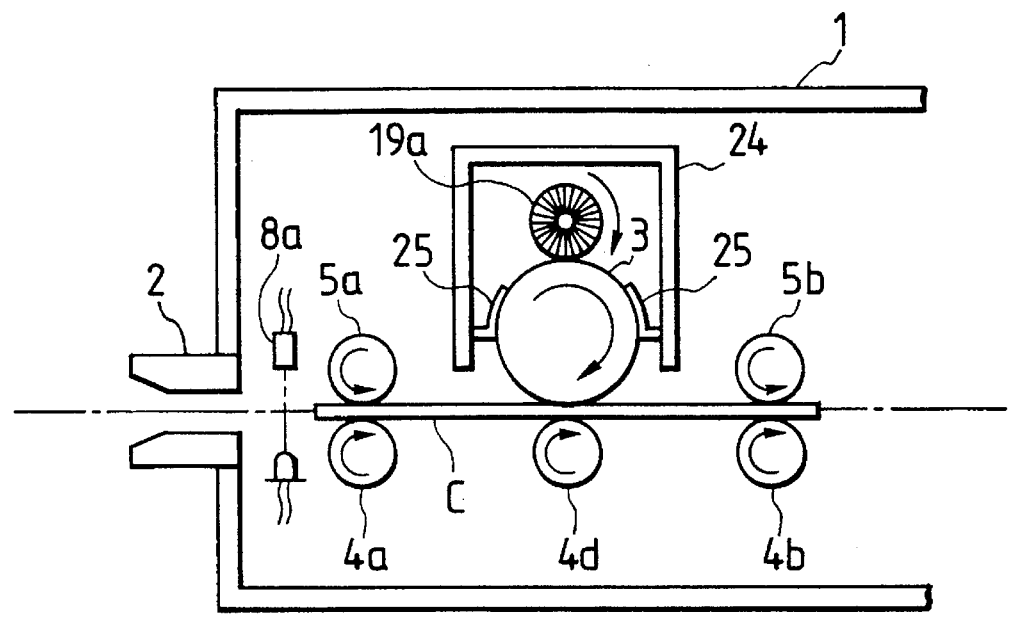
FIG. 15 is a schematic view of a cleaning apparatus for an information record medium according to the present invention.

FIG. 15 shows an embodiment wherein the brush 19 in FIG. 14 is replaced with a rotary brush 19a. In this case, if the rotational direction of the rotary brush 19a is set to be the same as that of a cleaning roller 3, the cleaning effect can be improved. However, the rotational direction of the rotary brush 19a may be opposite to that of the cleaning roller 3, and their speeds may be different from each other.

Figure 16:
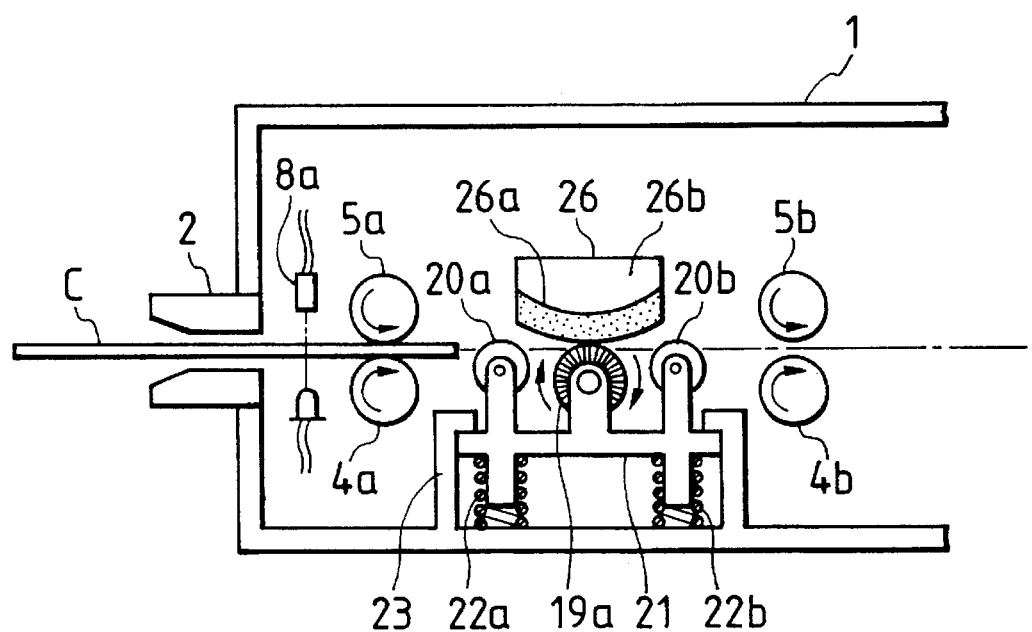
FIG. 16 is a schematic view of a cleaning apparatus for an information record medium according to the present invention.
Figure 17:
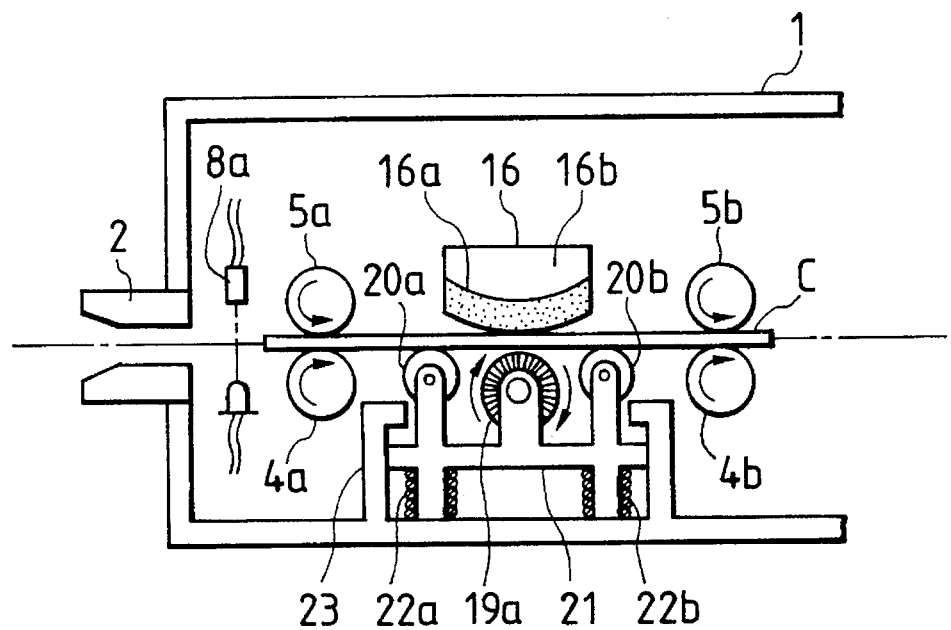
FIG. 17 is a schematic view of a cleaning apparatus for an information record medium according to the present invention.

FIGS. 16 and 17 show still another embodiment of the present invention. The brush 19 in the embodiment of FIG. 11 is replaced with a rotary brush 19a, and a fixed cleaning member 26 is used as the first cleaning member in place of the cleaning roller 3. This fixed cleaning member 26 is prepared such that a flexible cleaning material 26a such as a felt material is formed in an arcuate shape for an outer portion which is brought into contact with the surface of the card C, and the cleaning material 26a is adhered on the surface of a support 26b made of a proper material.

When the card C is not present under the fixed cleaning member 26, the rotary brush 19a is in rolling contact with the fixed cleaning member 26, as shown in FIG. 16, so that the surface of the fixed cleaning member 26 is cleaned. When the card C is conveyed under the fixed cleaning member 26, the rotary brush 19a is removed downward, as shown in FIG. 17. Instead, the cleaned surface of the fixed cleaning member 26 is brought into contact with the surface of the card C, thereby cleaning this surface. Meanwhile, the rotary brush 19a is kept separated from the card C. Therefore, dust is not attached to the lower surface of the card C.

Figure 18:
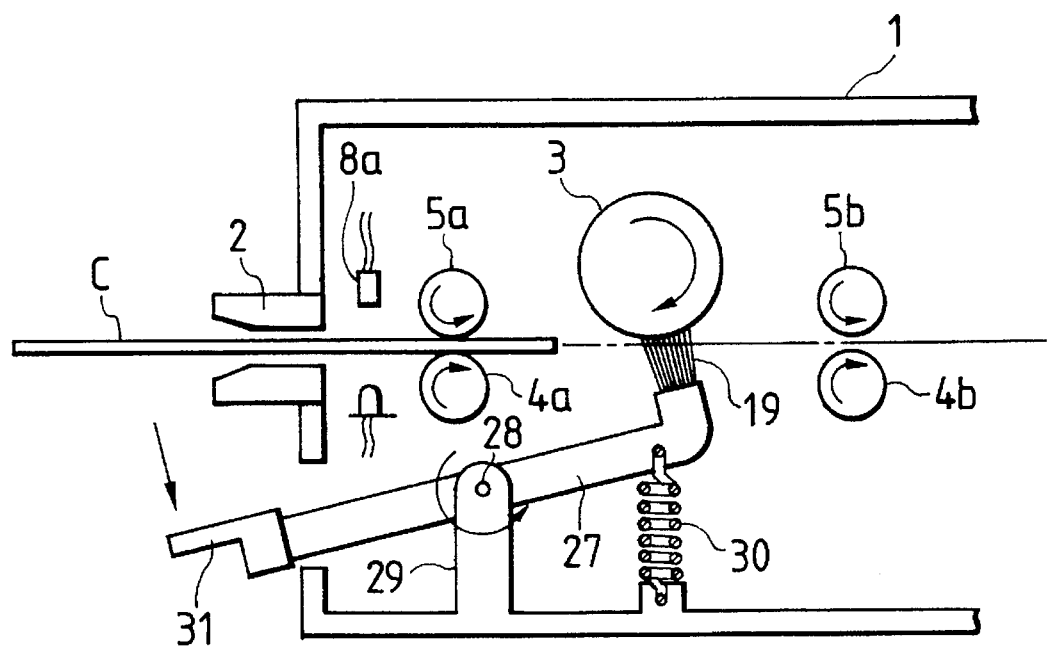
FIG. 18 is a schematic view of a cleaning apparatus for an information record medium according to the present invention.

FIG. 18 shows still another embodiment. A brush 19 is mounted at an inner edge of a lever 27. An intermediate portion of the lever 27 is pivoted by a support 29 about a shaft 28. At the same time, a spring 30 is connected to the lever 27 to bias the lever 27 in a direction for separating a brush 19 from a cleaning roller 3. A knob 31 formed on the outer end of the lever 27 is moved downward to urge the brush 19 against the outer surface of the cleaning roller 3, thereby cleaning the cleaning roller 3.

In this embodiment, the brush 19 is normally biased by the spring 30 at a position away from the cleaning roller 3. When the knob 31 is depressed in the absence of the card C under the cleaning roller 3 during rotation of the cleaning roller 3, the brush 19 is brought into the cleaning roller 3 as the first cleaning means to clean the cleaning roller 3. When the knob 31 is released, the brush 19 is pulled by the spring 30 and returns to the home position. When the card C is located below the cleaning roller 3, the cleaned surface of the cleaning roller 3 is brought into contact with the card C, thereby cleaning the surface of the card C. In this embodiment, when the cleaning roller 3 is badly stained or whenever cleaning is required, the user depresses the knob 31 to clean the surface of the cleaning roller 3 with the brush 19.

In each embodiment described above, the fixed brush or the rotary brush is used as the second cleaning means. However, the second cleaning means may be made by using the same material as the first cleaning means. It is essential that the second cleaning means remove the stain of the cleaning surface of the first cleaning means. The material, the shape, and the support of the second cleaning means may be arbitrarily changed and modified.

In the cleaning apparatus for the information record medium according to the present invention as described above, the stain of the first cleaning means for cleaning the information record medium is removed by the second cleaning means. The cleaning surface of the first cleaning means is kept cleaned, and the record surface of the information record medium can always be efficiently cleaned. At the same time, the service life of the first cleaning means can be effectively prolonged.

A means for detecting the degree of stain of the information record medium, as shown in FIG. 1, may also be arranged. If the means for detecting the degree of stain and the second cleaning means for cleaning the first cleaning means are simultaneously arranged, the information record medium can be more efficiently cleaned.

Still another embodiment of the present invention will be described in detail.

Figure 19:
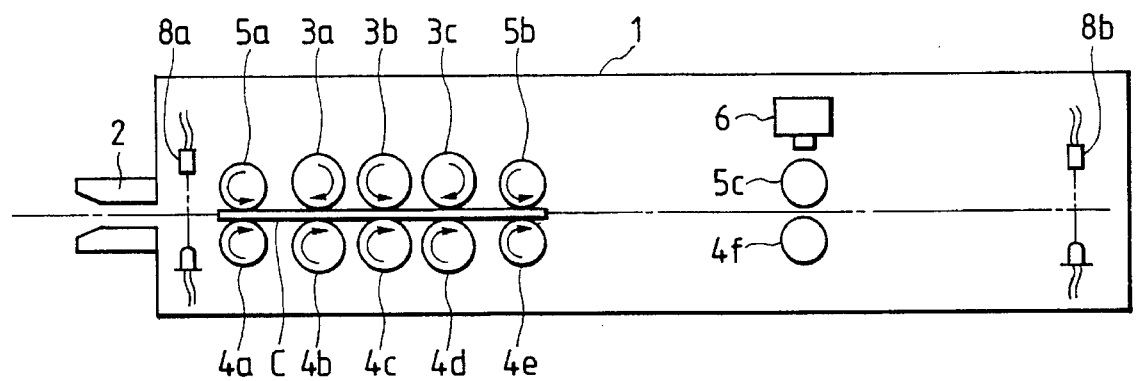
FIG. 19 is a schematic view of a cleaning apparatus for an information record medium according to the present invention.
Figure 20:
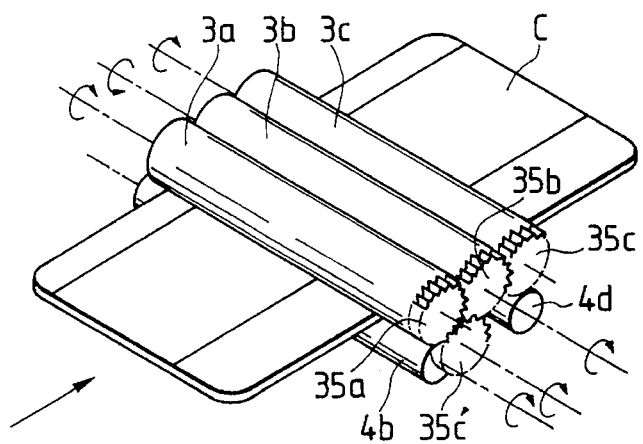
FIG. 20 is a perspective view of a cleaning mechanism shown in FIG. 19.

FIG. 19 shows a cleaning apparatus employed in an information record-reproduction system using an optical card as an information record medium. An insertion slot 2 is formed on one side surface of the system to receive a card C as an information record medium. Three cleaning rollers 3a, 3b, and 3c are arranged along a convey path of the card C inside the housing. The cleaning rollers 3a to 3c are cylindrical members covered with an elastic material which has properties for absorbing stain such as dust, fingerprints, and oil. Gears 35a, 35b, and 35c are attached to the ends (right ends in FIG. 21) of cleaning rollers 3a to 3c to transmit the power, as shown in FIG. 20. The cleaning rollers 3a to 3c are respectively paired with driving rollers 4b, 4c, and 4d of the driving rollers 4a, 4b, 4c, 4d, 4e, and 4f. The driving rollers 4a, 4e, and 4f are respectively paired with driven rollers 5a, 5b, and 5c. A gear 35c is mounted on one end of the drive roller 4c and meshed with a gear 35b of the cleaning roller 3b. A record-reproduction head 6 is arranged on the convey path of the card C to record information in or reproduce it from the card C. First and second photosensors 8a and 8b are arranged at the inlet side of an apparatus housing 1 and a deep portion opposite thereto to detect the presence/absence of the card C, thereby controlling the rotational direction of the driving rollers 4a to 4f.

With the above arrangement, when the card C is inserted from the insertion slot 2, the card C is detected by the inlet-side first photosensor 8a, and the driving rollers 4a to 4f are driven to convey the card C inside the housing. In this case, the rotational direction of the cleaning roller 3b which is in rolling contact with the surface of the card C is opposite (counterclockwise) to the rotational direction of the driving rollers 4a to 4f. The rotational direction of the cleaning rollers 3a and 3c is the same (clockwise) as the rotational direction of the driving rollers 4a to 4f and the speed of the rollers 3a to 3c is higher than that of the driving rollers 4a to 4f, thereby wiping out the stain such as dust, fingerprints, and oil attached to the surface of the card C. When cleaning is completed, the card C is conveyed below the head 6 by the cooperation of the driving rollers 4e and 4f and the driven rollers 5b and 5c. The head 6 records information in or reproduces it from the card C. When information recording or reproduction is completed, the card C is detected by the deep-side second photosensor 8b. The rotational direction of the driving rollers 4a to 4f is reversed, and the card C is unloaded from the insertion slot 2.

In this embodiment, the rotational direction of the two cleaning rollers 3a and 3c of the three cleaning rollers 3a to 3c is the same as that of the driving rollers 4b and 4d, and the speed of the cleaning rollers 3a and 3c is higher than that of the driving rollers 4a to 4f. The dust and the like attached to the card C is scattered outside the housing 1, and the dust will not reenter the housing 1.

The rotational direction and the speed of the cleaning rollers 3a and 3c are not limited to the ones described in this embodiment. For example, if the speed of the driving rollers 4b, 4c, and 4d is different from that for conveying the card C, the rotational direction of the driving rollers 4b, 4c, and 4d may be the same direction for conveying the card C. If the rotational direction of the cleaning rollers 3a and 3c is the same as that of the driving rollers 4a to 4f, the speed of the cleaning rollers 3a and 3c may be equal to or lower than that of the driving rollers 4a to 4f, thereby obtaining the good cleaning effect.

The card C is clamped between the driving rollers 4a to 4f and the cleaning rollers 3a to 3c and is conveyed by the frictional force between the driving rollers 4a to 4f and the card C. When the rotational direction of the cleaning rollers 3a and 3c is the same as that of the driving rollers 4a to 4f, i.e., when the rotational direction of the cleaning rollers 3a and 3c is opposite to the convey direction of the card C, a load acts against the force for conveying the card. However, according to the present invention, even if a plurality of cleaning rollers 3a to 3c are used, their rotational directions are set to be opposite to each other. The forces generated by the cleaning roller 3b and the cleaning rollers 3a and 3c rotated opposite to the rotational direction of the roller 3b cancel each other to reduce the load regardless of the number of rollers as compared with the case wherein the rollers are rotated together in one direction. Therefore, when an electrical means such as a motor and a solenoid is used as a driving means, power consumption can be greatly reduced. In addition, a sufficient cleaning effect can be obtained by the cleaning roller 3b rotated in the direction opposite to the paired driving roller 4c, that is, the cleaning roller 3b rotated in the convey direction of the card C since the speed of the roller 3c is different from that of the paired driving roller 4c.

In the embodiment shown in FIGS. 19 and 20, the rotational forces of the three cleaning rollers 3a to 3c are directly transmitted by the corresponding gears 35a to 35c, and the rotational directions of the adjacent cleaning rollers are opposite to each other. If three or more cleaning rollers are used, some of the adjacent rollers may be rotated in the same direction with the use of a belt or a gear train, or other rollers may be rotated in the opposite direction. It is therefore essential to reverse the rotational directions of some of the cleaning rollers.

Figure 21:
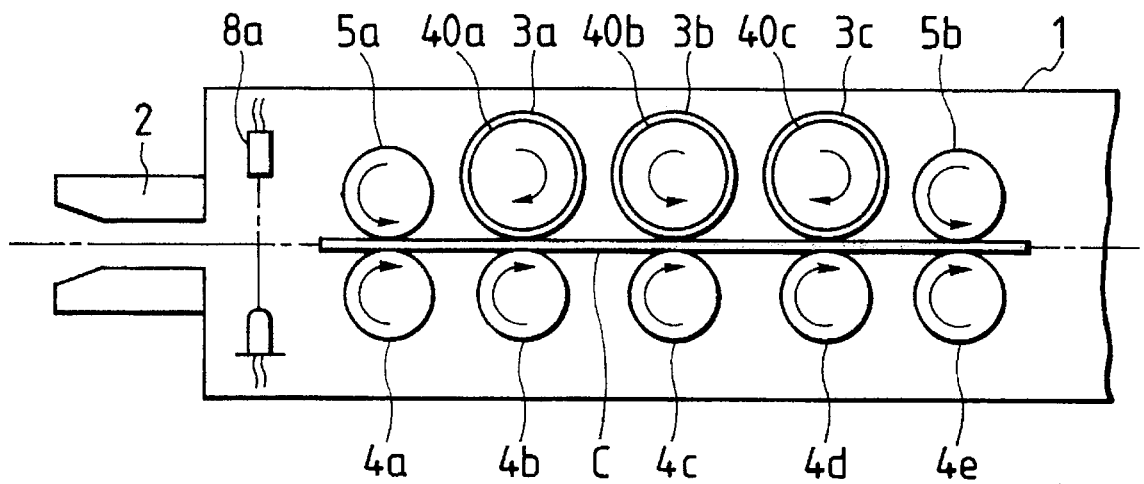
FIG. 21 is a schematic view of a cleaning apparatus for an information record medium according to the present invention.

FIG. 21 shows still another embodiment of the present invention. Cleaning rollers 3a to 3c used in this embodiment are prepared by covering cleaning members 40a, 40b, and 40c on cylindrical surfaces. The materials of the cleaning members 40a to 40c are different from each other. For example, the cleaning member 40a wound around the first cleaning roller 3a is made of a material (e.g., cloth, felt, or a rolled brush) suitable for removing relatively large dust particles when the stained card C enters the housing. The second cleaning member 40b arranged on the second cleaning roller 3b rotated in the direction opposite to that of other cleaning rollers is made of a material having fine texture suitable for removing small dust particles. In this manner, the materials of the cleaning rollers 3a to 3c are different from each other so as to provide different functions, thereby further improving the cleaning effect. In addition, at least one of the plurality of cleaning rollers 3a to 3c is made of a conductive cleaning material to eliminate the electrostatic components generated upon friction between the card C and the cleaning rollers.

Figure 22:
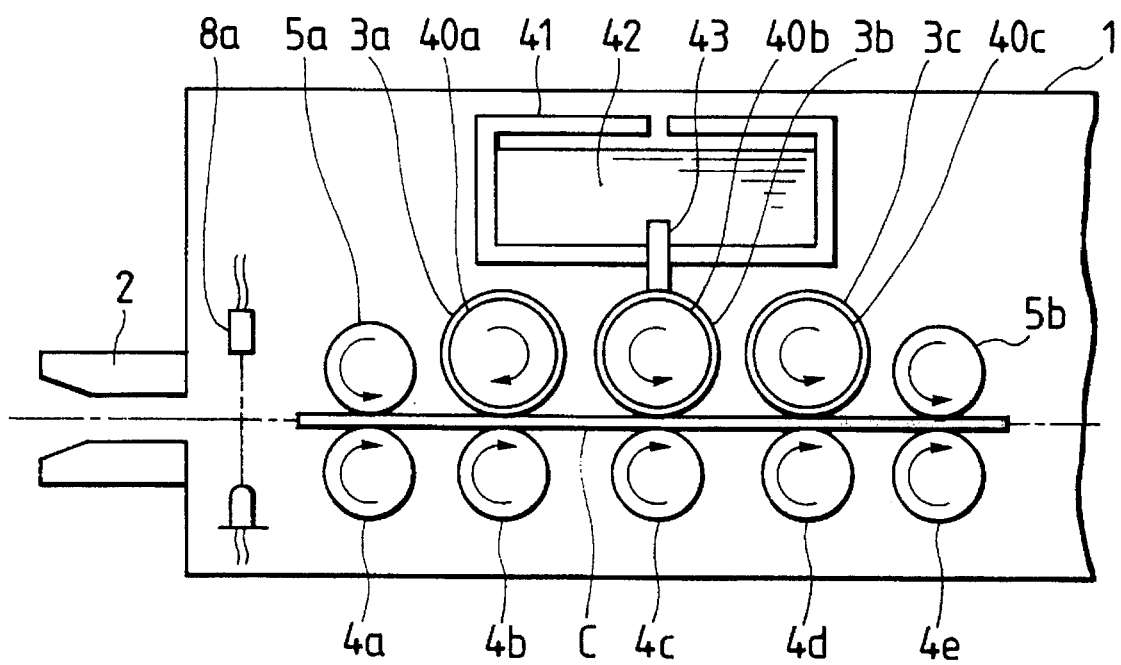
FIG. 22 is a schematic view of a cleaning apparatus for an information record medium according to the present invention.

FIG. 22 shows still another embodiment of the present invention. In this case, a central cleaning roller 3b of three cleaning rollers 3a to 3b comprises a wet roller having a high water-absorbing property. A cleaning solution 42 stored in a tank 41 is applied by a coating member 43 consisting of water-absorbing felt or the like. The end rollers 3a and 3c may have a cleaning member 40a of fine texture and a cleaning member 40c of coarse texture, respectively, as in FIG. 21. In any case, the surface of the inserted card C is cleaned in advance by the first cleaning roller 3a. The cleaning solution 42 is applied to the card C by the wet second cleaning roller 3b which is rotated in a direction opposite to that of the first cleaning roller 3a. The cleaning solution is then wiped by the third cleaning roller 3c. In this case, stain on the card C which is hard to remove can be removed by the wet cleaning roller 3b. If an antistatic solution is mixed in the cleaning solution 42, electrostatic components can also be removed from the card. Therefore, the cleaned card C is free from electrically charged dust.

In this embodiment, only the second cleaning roller 3b comprises a wet roller. However, for example, the first and second cleaning rollers 3a and 3b may be wet rollers. A cleaning solution may be applied to the first cleaning roller 3a, while an antistatic solution may be applied to the second cleaning roller 3b.

In the embodiments in FIGS. 21 and 22, the rotational directions of a plurality of cleaning rollers 3a to 3c are different from each other to improve cleaning efficiency while the load against the card convey force is kept reduced. In the embodiments, the information record medium is the card C. However, the present invention is also applicable to cleaning of information record media having other shapes.

In the cleaning apparatus for the information record medium according to the present invention as has been described above, the plurality of cleaning rollers are used, and the rotational direction of some of the rollers is opposite to that of the remaining rollers. In this case, even if the plurality of cleaning rollers are used, the load against the convey force for the information record medium is not increased, and effective cleaning of the information record medium can be achieved. Since the plurality of cleaning rollers are used, the service life of the cleaning members can be prolonged, and the cleaning rollers have different functions. Therefore, the cleaning effect and the electrostatic elimination effect can be improved.

In the above embodiment, three cleaning rollers are used. However, the same effect as in the above embodiments can be obtained when two cleaning rollers are used. When the two rollers are rotated in opposite directions, the load against the card convey force can be almost canceled, thus performing stable card cleaning.

The means for detecting the degree of stain of the information record medium, shown in FIG. 1, can also be arranged. If the means for detecting the degree of stain is combined with the plurality of cleaning rollers described above and some of the cleaning rollers are rotated in the reverse direction, effective and stable cleaning of the information record medium can be achieved.

As shown in FIG. 11 or the like, the second cleaning means can be additionally arranged to clean the first cleaning means. When the second cleaning means is combined with the plurality of cleaning rollers and some of the rollers are rotated in the reverse direction, effective and stable cleaning of the information recording medium can be achieved.

The means for detecting the degree of stain of the information record medium, as shown in FIG. 1, and the second cleaning means for cleaning the first cleaning means, as shown in FIG. 11 and the like can be additionally arranged.

When the means for detecting the degree of stain, the second cleaning means, and the plurality of cleaning rollers are used, and some of the rollers are rotated in the reverse direction, effective and stable cleaning of the information record medium can be performed.

Figure 23:
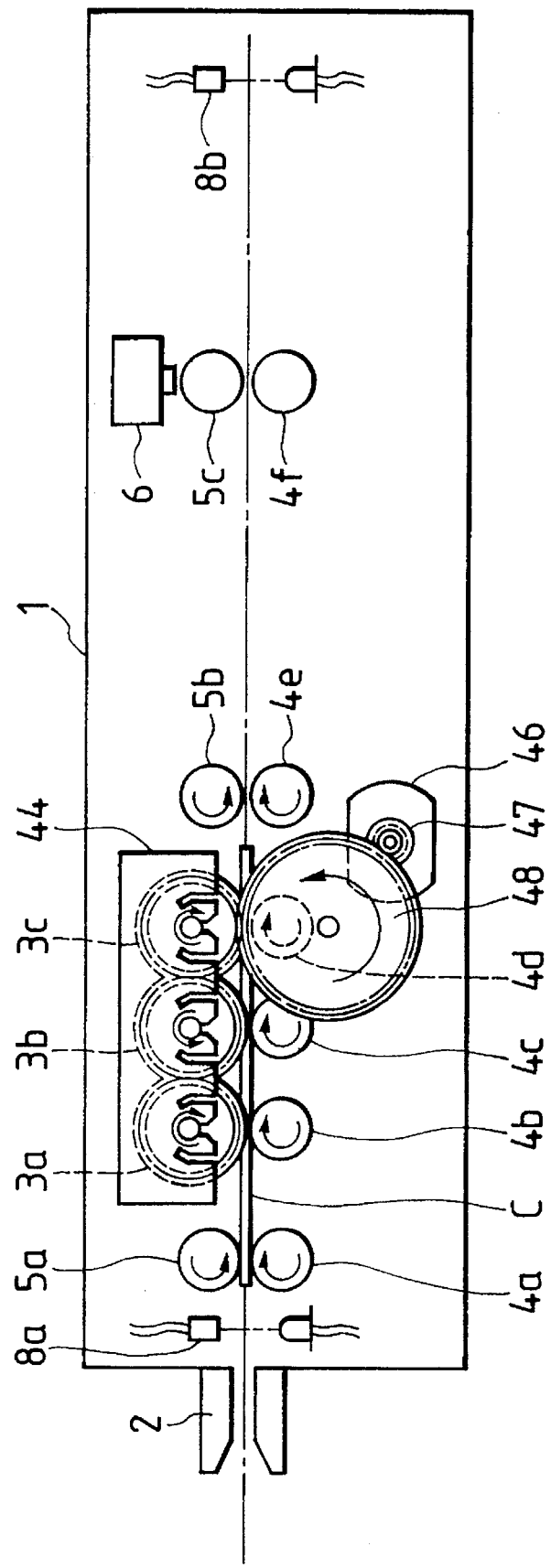
FIG. 23 is a schematic view of a cleaning apparatus for an information record medium according to the present invention.
Figure 24:
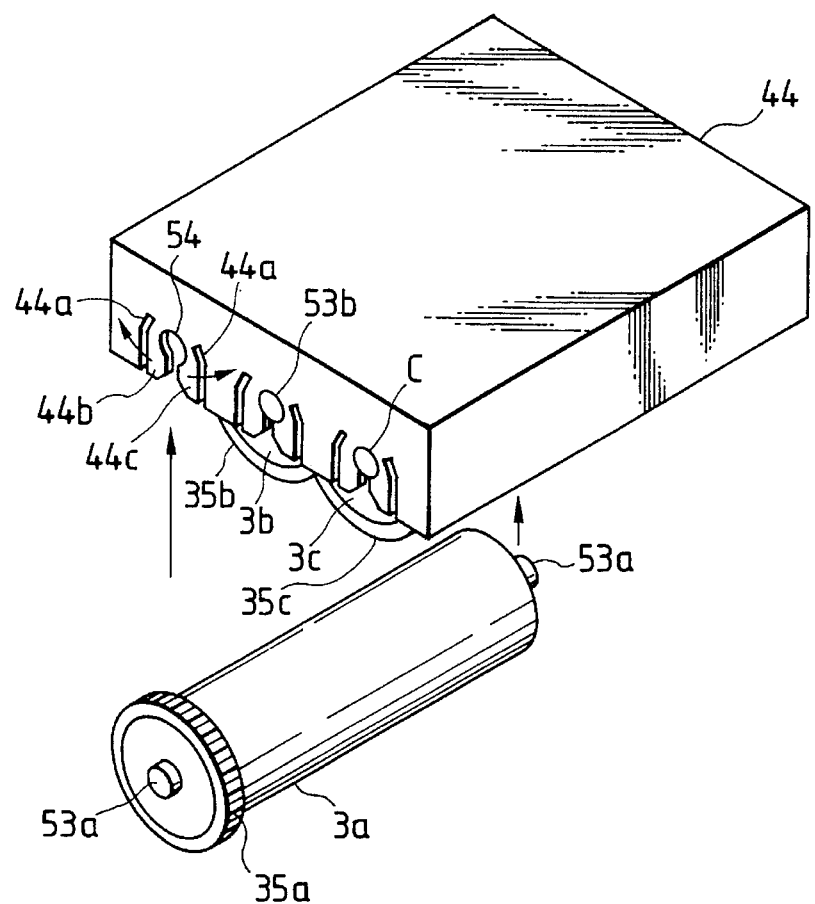
FIG. 24 is a perspective view of a cleaning mechanism shown in FIG. 23.
Figure 25:
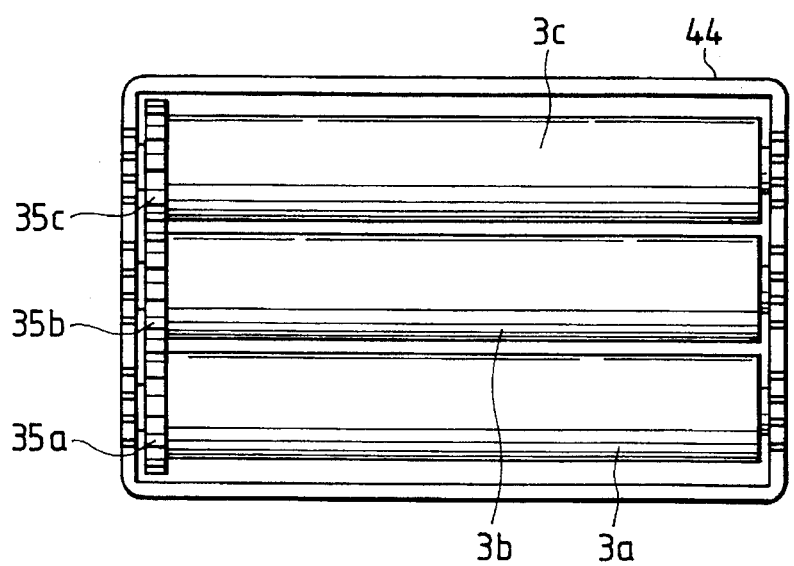
FIG. 25 is a bottom view of the cleaning mechanism shown in FIG. 23.

FIG. 23 shows a cleaning apparatus employed in an information record-reproduction system using an optical card as an information record medium according to still another embodiment of the present invention. An insertion slot 2 is formed on one side surface of an apparatus housing 1 to receive a card C. Three cleaning rollers 3a, 3b, and 3c are arranged along a convey path of the card C inside the housing 1. The cleaning rollers 3a to 3c comprise cylindrical members covered with an elastic material having a property for absorbing dust, fingerprints, oil, and the like. The cleaning rollers 3a to 3c are housed in a box-like holding member 44 made of, e.g., a synthetic resin, as shown in FIGS. 24 and 25. Each of spur gears 35a, 35b, and 35c is mounted on one end of a corresponding one of the cleaning rollers 3a to 3c to transmit the power. The spur gear 35c of the cleaning roller 3c is meshed with a power transmission gear 48 for a driving gear 47 of a motor 46. The cleaning rollers 3a to 3c are respectively paired with driving rollers 4b, 4c, and 4d of driving rollers 4a to 4f through the convey path. The driving rollers 4a, 4e, and 4f are respectively paired with driven gears 5a, 5b, and 5c through the convey path. A record-reproduction head 6 is arranged on the convey path of the card C to record information in or reproduce it from the card C. First and second photosensors 8a and 8b are formed at the inlet side of the housing 1 and at a deep side opposite to the inlet side to detect the presence/absence of the card C so as to control the rotational direction of the driving rollers 4a to 4f. As shown in FIG. 24, the cleaning rollers 3a to 3c are mounted at opening portions 54 of a holding member 44 through corresponding rotary shafts 53a, 53b, and 53c. Projections 44b and 44c partitioned by notches 44a formed at both sides of each opening portion 54 can be spread in the right-and-left direction. Therefore, the cleaning rollers 3a to 3c can be independently attached to or detached from the holding member 44. The rotary shafts 53a to 53c are held in the same manner as described above at the opposite ends.

With the above arrangement, when the card C is inserted from the insertion slot 2, the card C is detected by the inlet-side first photosensor 8a. The driving rollers 4a to 4f are rotated clockwise and the card C is received inside the housing 1. In this case, the cleaning roller 3b which abuts against the surface of the card C is rotated in the same direction (clockwise) as that of the driving rollers 4a to 4f. The cleaning rollers 3a and 3c are rotated in a direction opposite to that of the driving rollers 4a to 4f, and the speed of the cleaning rollers 3a to 3c is higher than that of the driving rollers 4a to 4f, thereby wiping off the stain such as dust, fingerprints, and oil attached to the surface of the card C. When cleaning is completed, the card C is conveyed to a position below the head 6 by the driving rollers 4e and 4f and the driven rollers 5b and 5c. The head 6 records information in or reproduces it from the card C. When information recording or reproduction is completed, the second photosensor 8b located in the deep portion of the housing 1 detects the card C. The driving rollers 4a to 4f are rotated in the reverse direction, thereby unloading the card C from the insertion slot 2.

In this embodiment, the rotational direction of the cleaning rollers 3a and 3c is the same as that of the driving rollers 4b and 4d. The speed of the cleaning rollers 3a and 3c is higher than that of the driving rollers 4b and 4d, thereby scattering the dust and the like attached to the card C outside the housing 1 and preventing the dust from reentering deep inside the housing 1.

However, the rotational direction and the speed of the cleaning rollers 3a to 3c are not limited to the ones exemplified in the above embodiment. For example, if the speed of the driving rollers 4b to 4d is different from the speed for conveying the card C, the rotational direction of the driving rollers 4b to 4d may be the convey direction of the card C. In addition, if the rotational direction of the cleaning rollers 3a and 3c is the same as that of the driving rollers 4b to 4d, the speed of the cleaning rollers 3a and 3c may be equal to or lower than that of the driving rollers 4b to 4d to obtain the same cleaning effect as described above.

The degree of collecting dust and the like attached to the cleaning members mounted on the surfaces of the cleaning rollers 3a to 3c is in the order of the first cleaning roller 3a located near the inlet port, and then the second and third cleaning rollers 3b and 3c because most of the dust and the like attached to the card C is removed by the cleaning roller 3a.

In this embodiment, the cleaning rollers 3a to 3c can be independently attached to or detached from the holding member 44, and can be freely exchanged with new ones independently, thus achieving functional, economical cleaning.

Figure 26:
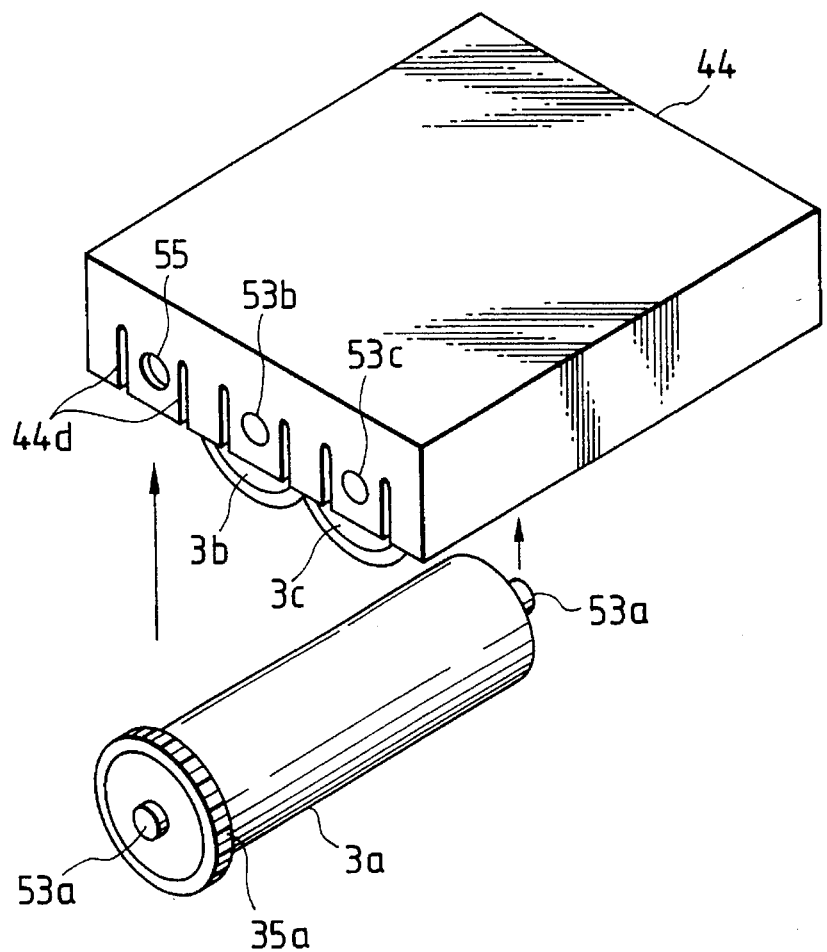
FIG. 26 is a perspective view of another cleaning mechanism.
Figure 27:
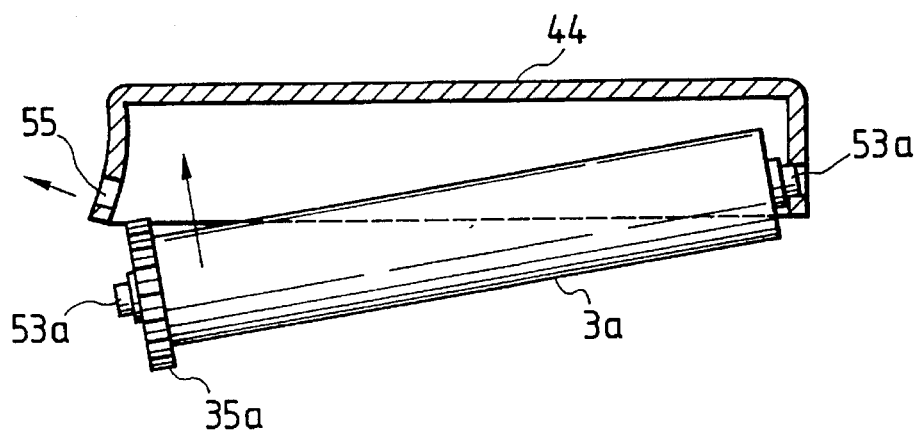
FIG. 27 is a view for explaining attachment/detachment of the cleaning mechanism shown in FIG. 26.

FIG. 26 shows still another embodiment. Cleaning rollers 3a to 3c are held in a holding member 44 through corresponding rotary shafts 53a to 53c. In this case, unlike the embodiment of FIG. 23, the rotary shafts 53a to 53c are detachably mounted in holes 55 of the holding member 44, and notches 44d are formed at both sides of each hole 55. As shown in FIG. 27, the member portions corresponding to the holes 55 are spread outward by utilizing elasticity of the holding member 44, and the rotary shafts 53a to 53c are inserted into the corresponding holes 55.

In this embodiment, the spur gear is used as the power transmitting means for the adjacent cleaning rollers. If the cleaning rollers 3a to 3c can be integrally operated and can be independently attached or detached, other power transmitting means such as a bevel gear or a friction wheel may be used in place of the spur gear.

In the cleaning apparatus for an information record medium according to the present invention as described above, the plurality of cleaning rollers can be independently attached or detached. The cleaning rollers can be sequentially replaced with new ones in accordance with the degree of stain, thereby achieving economical, effective cleaning.

A means for detecting the degree of stain of the information record medium, as shown in FIG. 1, may be additionally used. When the means for detecting the degree of stain is combined with the plurality of cleaning rollers which can be independently detached/attached, the information record medium can be effectively and economically cleaned.

The second cleaning means for cleaning the first cleaning means, as shown in FIG. 11, can also be employed. When the second cleaning means and the plurality of cleaning rollers which can be independently attached/detached are combined, the information record medium can be effectively and economically cleaned.

The plurality of cleaning rollers, as shown in FIG. 19, may be used, and some of the rollers may be rotated in the reverse direction. If an arrangement of reverse rotation is combined with the plurality of cleaning rollers which can be independently attached or detached, the information record medium can be stably and economically cleaned.

The means for detecting the degree of stain of the information record medium, as shown in FIG. 1 or the like and the second cleaning means for cleaning the first cleaning means, as shown in FIG. 11 and the like may be additionally arranged. When the means for detecting the degree of stain, the second cleaning means, and the plurality of cleaning rollers which can be independently attached or detached are combined, the information record medium can be efficiently and economically cleaned.

The second cleaning means for cleaning the first cleaning means, as shown in FIG. 1 and the like, and the plurality of cleaning rollers, as shown in FIG. 19 and the like are employed, and some of the rollers are rotated in the reverse direction. When the second cleaning means, the arrangement of reverse rotation, and the plurality of cleaning rollers which are independently attached or detached are combined, the information record medium can be effectively, stably, and economically cleaned.

The means for detecting the degree of stain of the information record medium, as shown in FIG. 1 and the like, and the plurality of cleaning rollers, as shown in FIG. 19 and the like may be used, and some of the cleaning rollers may be rotated in the reverse direction. When the means for detecting the degree of stain, the arrangement of reverse rotation, and the plurality of cleaning rollers which are independently attached or detached are combined, the information record medium can be efficiently, stably, and economically cleaned.

The means for detecting the degree of stain of the information record medium, as shown in FIG. 1 and the like, the second cleaning means for cleaning the first cleaning means, as shown in FIG. 11 and the like, and the plurality of cleaning rollers, as shown in FIG. 19 and the like may be used, and some of the cleaning rollers may be rotated in the reverse direction. When the means for detecting the degree of stain, the second cleaning means, the arrangement of reverse rotation, and the plurality of cleaning rollers which can be independently attached or detached are combined, the information record medium can be effectively, stably, and economically cleaned.

What is claimed is:

1. An information recording-reproducing system including means for cleaning an information recording medium, said system comprising:

recording-reproducing means for recording information on and/or reproducing information from the information recording medium;

means for moving the information recording medium and said recording-reproducing means relative to each other;

cleaning means for cleaning the information recording medium;

a brush for cleaning said cleaning means, said brush always being in contact with said cleaning means, in order to clean said cleaning means;

a dust collector for collecting dust generated when said brush cleans said cleaning means; and a detachable frame for removably mounting said cleaning means, said brush and said dust collector as a unit.

2. A system according to claim 1, wherein said brush is a rotary brush.

3. An information recording-reproducing system including means for cleaning an information recording medium, said system comprising:

recording-reproducing means for recording information on and/or reproducing information from the information recording medium;

means for moving the information recording medium and said recording-reproducing means relative to each other;

cleaning means for cleaning the information recording medium;

a brush for cleaning said cleaning means; and a movable member for movably mounting said brush, said movable member moving said brush between (i) a contact position in which said brush cleans said cleaning means and (ii) a non-contact position in which said cleaning means cleans the recording medium.

4. A system according to claim 3, further comprising a plurality of springs, on which said movable member is mounted, for urging said movable member and said brush towards said cleaning means.

5. A system according to claim 3, further comprising rollers mounted on said movable member for contacting the recording medium to urge said movable member and said brush away from said cleaning means when said cleaning means cleans the recording medium.

6. A system according to claim 3, wherein said movable member comprises a lever.

7. A system according to claim 3, further comprising a spring connected to said lever for biasing said lever in a direction, which separates said brush from said cleaning means.

* * * * *

UNITED STATES PATENT AND TRADEMARK OFFICE
CERTIFICATE OF CORRECTION

PATENT NO. : 5,606,159
DATED : February 25, 1997
INVENTOR(S) : HIDEO KURIHARA

It is certified that error appears in the above-identified patent and that said Letters Patent is hereby corrected as shown below:

<u>Column 17</u>

Line 22, "freely." should read --freely--.

Signed and Sealed this

Twenty-third Day of December, 1997

Attest:

BRUCE LEHMAN

Attesting Officer

Commissioner of Patents and Trademarks